US011856626B2

(12) United States Patent
Huang et al.

(10) Patent No.: US 11,856,626 B2
(45) Date of Patent: Dec. 26, 2023

(54) SECONDARY PATH CONFIGURATION

(71) Applicant: ZTE Corporation, Guangdong (CN)

(72) Inventors: He Huang, Shenzhen (CN); Zhongda Du, Shenzhen (CN); Zijiang Ma, Shenzhen (CN); Jing Liu, Shenzhen (CN); Xin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/522,056

(22) Filed: Nov. 9, 2021

(65) Prior Publication Data
US 2022/0070956 A1 Mar. 3, 2022

Related U.S. Application Data

(63) Continuation of application No. 16/443,445, filed on Jun. 17, 2019, now Pat. No. 11,191,118, which is a continuation of application No. PCT/CN2017/088729, filed on Jun. 16, 2017.

(51) Int. Cl.
H04W 76/15 (2018.01)
H04W 76/11 (2018.01)
H04W 76/36 (2018.01)
H04W 40/24 (2009.01)
H04W 40/34 (2009.01)
H04W 72/23 (2023.01)

(52) U.S. Cl.
CPC ......... *H04W 76/15* (2018.02); *H04W 40/246* (2013.01); *H04W 40/34* (2013.01); *H04W 76/11* (2018.02); *H04W 76/36* (2018.02); *H04W 72/23* (2023.01)

(58) Field of Classification Search
CPC ..... H04W 76/15; H04W 76/11; H04W 76/36; H04W 40/246; H04W 40/34; H04W 72/042
See application file for complete search history.

(56) References Cited

U.S. PATENT DOCUMENTS

| 2012/0281655 | A1 | 11/2012 | Jung et al. |
| 2014/0023043 | A1 | 1/2014 | Yang et al. |
| 2015/0124646 | A1 | 5/2015 | Yun et al. |
| 2015/0312947 | A1 | 10/2015 | Park et al. |
| 2015/0319801 | A1 | 11/2015 | Lee et al. |

(Continued)

FOREIGN PATENT DOCUMENTS

| CN | 103907388 A | 7/2014 |
| CN | 104581681 A | 4/2015 |

(Continued)

OTHER PUBLICATIONS

First Office Action for KR Appl. No. 10-2019-7019940, dated Sep. 14, 2020.

(Continued)

*Primary Examiner* — Ayaz R Sheikh
*Assistant Examiner* — Tarell A Hampton
(74) *Attorney, Agent, or Firm* — Foley & Lardner LLP

(57) ABSTRACT

One or more devices, systems, and/or methods for facilitating use of a radio bearer using a secondary path are provided. For example, a configuration message may be used to determine whether a secondary path is present. The secondary path may be configured based upon the configuration message.

18 Claims, 14 Drawing Sheets

(56) References Cited

U.S. PATENT DOCUMENTS

| | | | |
|---|---|---|---|
| 2015/0327094 A1 | 11/2015 | Lee et al. | |
| 2016/0029245 A1 | 1/2016 | Hong et al. | |
| 2016/0037527 A1 | 2/2016 | Kim et al. | |
| 2016/0057800 A1 | 2/2016 | Ingale et al. | |
| 2016/0073442 A1 | 3/2016 | Koskinen et al. | |
| 2016/0174172 A1 | 6/2016 | Rahman et al. | |
| 2016/0242193 A1 | 8/2016 | Hong et al. | |
| 2016/0270061 A1 | 9/2016 | Dinan | |
| 2016/0285716 A1* | 9/2016 | Pelletier | H04L 43/0811 |
| 2016/0316508 A1 | 10/2016 | Hong et al. | |
| 2016/0330740 A1 | 11/2016 | Uchino et al. | |
| 2016/0338038 A1 | 11/2016 | Zhang et al. | |
| 2017/0111832 A1 | 4/2017 | Wen et al. | |
| 2018/0098266 A1 | 4/2018 | Futaki | |
| 2018/0352462 A1 | 12/2018 | Wu | |

FOREIGN PATENT DOCUMENTS

| | | | |
|---|---|---|---|
| CN | 105052233 A | 11/2015 | |
| CN | 106063330 A | 10/2016 | |
| EP | 2 866 498 A1 | 4/2015 | |
| EP | 2 925 045 A1 | 9/2015 | |
| JP | 2015-530042 A | 10/2015 | |
| KR | 2016/0127174 A | 11/2016 | |
| WO | WO-2007/101395 A1 | 9/2007 | |
| WO | WO-2014/031989 A1 | 2/2014 | |
| WO | WO-2014031989 A1 * | 2/2014 | H04L 5/0032 |
| WO | WO-2014/147984 A1 | 9/2014 | |

OTHER PUBLICATIONS

3rd Generation Partnership Project, "Technical Specification Group Radio Access Network; Evolved Universal Terrestrial Radio Access (E-UTRA); Radio Resource Control (RRC); Protocol specification (Release 14)", Sophia Antipolis Valbonne, France (721 pages).

"Packet duplication in NR", 3GPP Draft; R2-1700423 Packet Duplication in NR, 3rd Generation Partnership Project (3GPP), Mobile Competence Centre; France, Jan. 17, 2017 (Jan. 17, 2017), XP051211002, Retrieved from the Internet: URL: http://www.3gpp.org/ftp/Meetings -3GPP - SYNC/RAN2/Docs/ [retrieved on Jan. 17, 2017].

CATT: "PDCP Duplication", 3GPP Draft; R2-1703114, 3rd Generation Partnership Project (3GPP), Mobile Competence Centre, France; Apr. 2017 (Apr. 3, 2017), XP051245053, Retrieved from the Internet: URL: http://www.3gpp.org/ftp/Meetings -3GPP - SYNC/RAN2/Docs/ [retrieved on Apr. 3, 2017].

Extended European Search Report on EP 17914004.1 dated Nov. 26, 2019 (8 pages).

First Office Action for CN Appl. No. 201780092157.3, dated Jun. 22, 2021 (with English translation, 16 pages).

First Office Action for IN Appl. No. IN 201917024835 dated Dec. 14, 2020 (10 pages).

First Office Action for JP Appl. No. 2019-537784, dated Jun. 22, 2021 (with English translation, 8 pages).

First Office Action for JP Appl. No. 2019-537784, dated Oct. 23, 2020. (with English translation, 6 pages).

Foreign Action other than Search Report on EP 17914004.1 dated Dec. 14, 2020.

International Search Report and Written Opinion for International Appl. No. PCT/CN2017/088729, dated Feb. 26, 2018.

Nokia et al.: "Overview of Duplication Operation" 3GPP TSG-RAN WG2 Meeting #97bis; R2-1702632; Apr. 7, 2017, Spokane, USA (2 pages).

Nokia et al: 1 Overview of Duplication Operation, 3GPP Draft; R2-1702632, Overview of Duplication Operation, 3rd Generation Partnership Project (3GPP), Mobile Competence Centre; France; Apr. 3, 2017 (Apr. 3, 2017), XP051244634, Retrieved from the Internet: URL: http://www.3gpp.org/ftp/Meetings -3GPP -SYNC/RAN2/Docs/ [retrieved on Apr. 3, 2017].

Non-Final Office Action on U.S. Appl. No. 16/443,445 dated Nov. 2, 2020.

Second Korean Office Action on KR 10-2019-7019940 dated Feb. 17, 2021 (12 pages, including English translation).

U.S. Notice of Allowance on U.S. Appl. No. 16/443,445 dated Aug. 10, 2021.

U.S. Office Action on U.S. Appl. No. 16/443,445 dated May 11, 2021.

* cited by examiner

SECONDARY PATH CONFIGURATION

CROSS-REFERENCE TO RELATED APPLICATIONS

This application claims the benefit of priority under 35 U.S.C. § 120 as a continuation of U.S. Non-Provisional patent application Ser. No. 16/443,445, filed on Jun. 17, 2019, which is a continuation of PCT Patent Application No. PCT/CN2017/088729 filed on Jun. 16, 2017, each of which is incorporated by reference herein in its entirety.

BACKGROUND

A communication link between nodes (e.g., communication devices, network entities, etc.), such as between a user equipment (UE) and a base station (BS), between two UEs and/or between two BSs, may be facilitated using one or more radio bearers. For example, the BS may use a radio bearer to generate one or more signals and/or transmit one or more signals to the UE. The UE may use the radio bearer to receive and/or process one or more signals and/or process one or more signals received from the BS.

SUMMARY

In accordance with the present disclosure, one or more devices and/or methods for facilitating use of a radio bearer using a secondary path are provided. In an example, a configuration message may be received from a network entity. At least one secondary path may be determined based upon the configuration message. The at least one secondary path may be configured based upon the configuration message. A response message may be sent to the network entity.

In an example, a request to establish at least one secondary path in association with a radio bearer may be transmitted to a network entity. A response to the request may be received from the network entity. The response may comprise radio resource information and address information. A configuration message may be generated based upon the radio resource information and the address information. The configuration message may comprise at least one secondary path identity. The configuration message may be transmitted to a communication device.

In an example, radio resource information and address information may be determined based upon a request to establish at least one secondary path. A configuration message may be generated based upon the radio resource information and the address information. The configuration message may comprise at least one secondary path identity. The configuration message may be transmitted to a communication device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

One or more computing devices and/or techniques for facilitating use of a radio bearer using a secondary path are provided. For example, a user equipment (UE) may connect to a (e.g., (e.g., wireless and/or wired) communication) network via a base station (BS) of the network. The BS may transmit information to the UE via signals, such that the UE receives the signals. Transmission of information via signals may involve a radio bearer (e.g., that is anchored in the BS) processing the information. To be able to use the information in the signal received, the UE may process the signal using the radio bearer. Some methods of processing information using radio bearers may use an increasing (e.g., greater than threshold) number of types of radio bearers, which may introduce considerable complexity in maintenance of protocol on the UE (e.g., and thus provide for communication between the BS and the UE that is more costly, less reliable and/or associate with a lower data rate than is possible and/or desirable). Further complexity may arise from situations where a change in radio bearer type is necessitated and/or desired. Thus, in accordance with one or more of the techniques presented herein, the processing of information using radio bearers may be facilitated by introducing a secondary path (e.g., between a radio bearer and one or more entities of the UE) in a manner that mitigates the complexity, improves efficiency and/or provides for the capability of the UE to provide for optimal communication (e.g., with improved quality, reduced processing, memory and/or bandwidth usage, etc.) between the BS (e.g., and/or one or more other BSs) and the UE (e.g., and/or one or more other UEs).

Figure 1A:
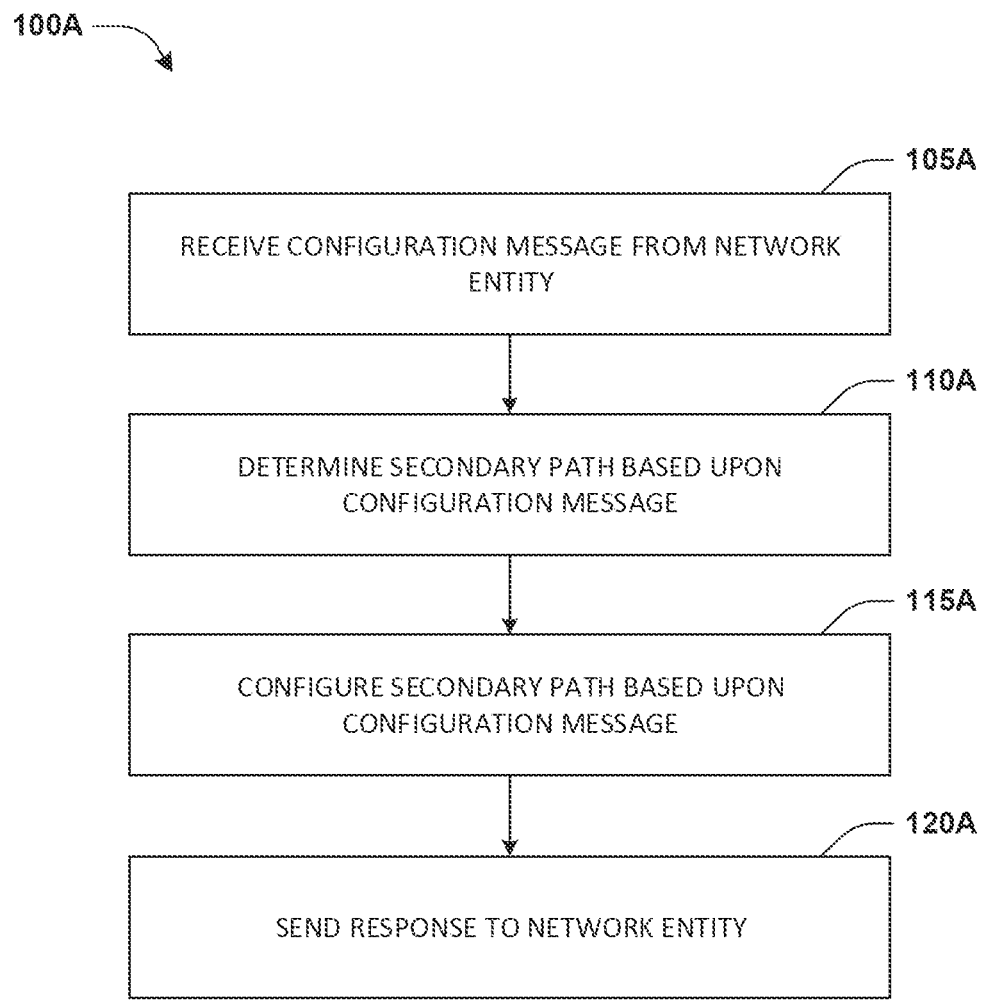
FIG. 1A is a flow chart illustrating an example method for facilitating use of a radio bearer using a secondary path.

An example method 100A of facilitating use of a radio bearer using a secondary path is illustrated in FIG. 1A. The radio bearer may be associated with (e.g., used by) a service being provided to a communication device (e.g., a UE), may provide a configuration for a layer (e.g., Layer-2, Physical, etc.) and/or may be used to transfer user data and/or control data from the layer to one or more other (e.g., upper) layers. Thus, the radio bearer may operate as a service access point between the layer and the one or more other (e.g., upper) layers. Accordingly, at 105A, the communication device (e.g., the UE) may receive a configuration message from a network entity (e.g., a base station of a network). The configuration message may comprise a secondary path identity, such as a secondary logical channel identity. The configuration message may alternatively and/or additionally comprise a primary path identity, such as a primary logical channel identity.

At 110A, a secondary path (e.g., a secondary logical channel) may be determined based upon the configuration message. For example, the secondary path may be determined based upon the secondary path identity. Alternatively and/or additionally, a primary path (e.g., a primary logical channel) may be determined based upon the configuration message. For example, the primary path may be determined based upon primary path identity.

In some examples, a determination may be made as to whether a first portion of the configuration message or a second portion of the configuration message comprises secondary path information. The first portion may comprise information generated by and/or received from the network entity and/or may be used to configure one or more resources in a first (e.g., master) cell group. The second portion may comprise information generated by and/or received from a second network entity and/or may be used to configure one or more resources in a second (e.g., secondary) cell group. Responsive to determining that the first portion comprises the secondary path information, the first portion (e.g., and not the second portion) may be (e.g., selectively) analyzed to identify the secondary path identity corresponding to the secondary path.

At 115A, the secondary path may be configured based upon the configuration message.

In some examples, a determination may be made as to whether the secondary path is present (e.g., and/or in active use) in the communication device (e.g., the UE). For example, the determination may comprise determining whether the secondary path is present in a cell group. The cell group may be determined and/or identified by the first portion of the configuration message determined to comprise the secondary path information. The determination as to whether the secondary path is present may be made based upon one or more parameters comprised in the configuration message and/or may be made by searching one or more portions of the communication device for the secondary path and/or for one or more indicators associated with the secondary path.

Alternatively and/or additionally, the determination may be based upon a number of paths determined to be between a first component of the communication device and/or the network entity and a second component of the communication device and/or the network entity (e.g., and/or determined to be used to connect the first component to the second component and/or transmit data between the components). For example, if less than two (e.g., zero, one, etc.) paths are determined to be between the first component of the communication device and/or the network entity and the second component of the communication device and/or the network entity, a determination may be made that the secondary path is not present in the communication device. In some examples, if two or more paths are determined to be between the first component of the communication device and/or the network entity and the second component of the communication device and/or the network entity, a determination may be made that the secondary path is present in the communication device.

In response to determining that the secondary path is present (e.g., and/or in active use) in the communication device, the secondary path may be modified based upon the configuration message. For example, a mapping between the secondary path and a radio bearer may be modified. For example, the secondary path may change from being mapped to the radio bearer in a first arrangement (e.g., via one or more first components) to being mapped to the radio bearer in a second arrangement (e.g., via one or more second components). In some examples, the radio bearer may be determined (e.g., identified) based upon a bearer identity comprised in the configuration message. In response to determining that the configuration message comprises an instruction to change a type of the radio bearer from a first bearer type to a second bearer type, one or more components of the communication device and/or the network entity may be modified from a first configuration that corresponds to the first bearer type to a second configuration that corresponds to the second bearer type.

In some examples, modifying the secondary path may comprise reconfiguring one or more radio link control (RLC) entities associated with the secondary path from a first RLC configuration to a second RLC configuration (e.g., in accordance with one or more parameters in the configuration message), reconfiguring an operation mode of the secondary path from a first operation mode to a second operation mode (e.g., in accordance with one or more parameters in the configuration message) and/or reconfiguring a packet data convergence protocol (PDCP) entity from a first PDCP configuration to a second PDCP configuration (e.g., in accordance with one or more parameters in the configuration message).

In some examples, in response to determining that the configuration message comprises an instruction to release the secondary path and/or an instruction to delete one or more radio bearers linked to the secondary path, a mapping between the secondary path and the radio bearer, one or more RLC entities, the secondary path and/or the radio bearer may be deleted from the communication device and/or the network entity (e.g., in accordance with one or more parameters in the configuration message).

In some examples, responsive to determining that the configuration message comprises an instruction to release the at least one secondary path and/or is determined not to correspond to a change to a first bearer type, a PDCP status report may be triggered and/or transmitted to the network entity. The configuration message may be determined to not correspond to the change to the first bearer type based upon the configuration message not comprising an (e.g., explicit) instruction to change the first bearer type and/or based upon the configuration message not causing one or more actions (e.g., indirectly and/or implicitly) resulting in the change to the first bearer type.

In some examples, responsive to determining that the configuration message comprises an instruction to release the at least one secondary path and/or is determined not to correspond to a reestablishment of a PDCP entity, a PDCP status report may be triggered and/or transmitted to the network entity. The configuration message may be determined to not correspond to the reestablishment of the PDCP entity based upon the configuration message not comprising an (e.g., explicit) instruction to reestablish the PDCP entity and/or based upon the configuration message not causing one or more actions (e.g., indirectly and/or implicitly) resulting in the reestablishment of the PDCP entity.

In response to determining that the secondary path is not present in the communication device, the secondary path may be established in the communication device based upon the configuration message and/or may connect the communication device to the network entity (e.g., which comprises a radio bearer and/or a packet data convergence protocol configuration (PDCP) of the radio bearer, and is therefore anchored by this radio bearer) and/or to a second network entity (e.g., which does not comprise the radio bearer and/or the PDCP of the radio bearer, and is therefore unanchored by this radio bearer). For example, the secondary path may be generated in the communication device and/or the radio bearer, an RLC entity and/or a mapping between the secondary path and the radio bearer may be generated in the network entity. The radio bearer may be determined (e.g., identified) and/or generated based upon a bearer identity comprised in the configuration message. Alternatively and/or additionally, the radio bearer may be determined and/or generated based upon a bearer identity comprised in a different (e.g., previous) configuration message.

The secondary path may be generated based upon at least some of the configuration message, such as the secondary path identity and/or a RLC configuration corresponding to a RLC entity (e.g., of the network entity). The secondary path may be connected to and/or enabled via the RLC entity.

The secondary path may be modified to have and/or be generated to have a mode that is determined based upon a secondary path mode identity comprised in the configuration message. For example, in response to determining that the secondary path mode identity comprises a first identity (e.g., indicative of a duplication mode), the mode of the secondary path may be determined (e.g., and set) to be a duplication mode. In another example, in response to determining that the secondary path mode identity comprises a second identity (e.g., indicative of a split mode), the mode of the secondary path may be determined (e.g., and set) to be a split mode.

At 120A, a response indicative of a status of the configuration message and/or one or more actions taken after receipt of the configuration message may be sent from the communication device to the network entity and/or the second network entity.

It may be appreciated that at least some of the modules, diagrams and/or techniques of FIGS. 2A, 2B, 3A, 3B, 4A, 4B (e.g., and/or other Figs.) may be incorporated and/or implemented in the performance of method 100A.

Figure 1B:
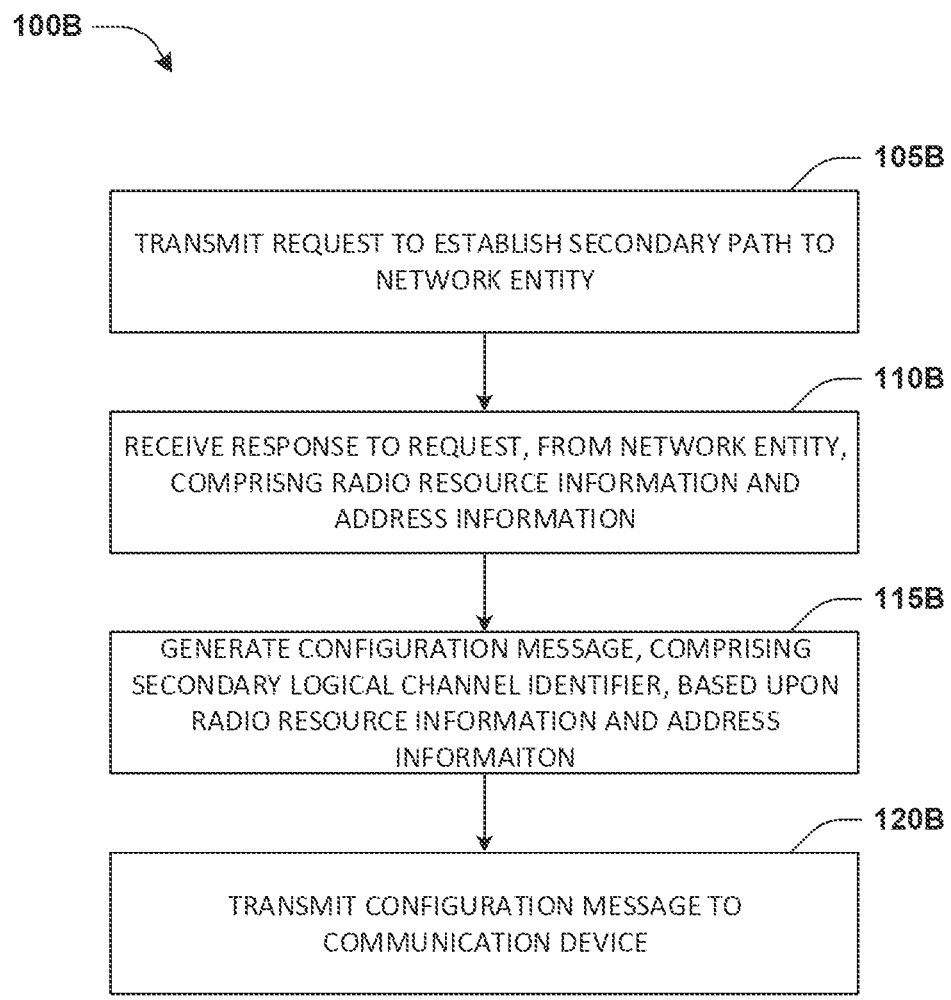
FIG. 1B is a flow chart illustrating an example method for facilitating use of a radio bearer using a secondary path.

An example method 100B of facilitating use of a radio bearer using a secondary path is illustrated in FIG. 1B. Network entities (e.g., within a network) may comprise one or more base stations, such as an evolved NodeB (eNB), an MeNB, an SgNB, a serving gateway (S-GW) and/or a mobility management entity (MME). Accordingly, at 105B, a second network entity (e.g., of a network) may transmit a request to establish (e.g. and/or modify) a secondary path for a radio bearer to a network entity (e.g., of the network). The request may comprise an indication of a communication device (e.g., a UE) upon which the secondary path is to be established (e.g., and/or modified).

At 110B, a response to the request is received from the network entity (e.g., by the second network entity). The response may comprise one or more parameters (e.g., associated with the communication device) such as radio resource information and/or address information. The address information may comprise an X2 downlink (DL) transport network layer (TNL) address.

At 115B, a configuration message may be generated based upon the radio resource information and/or the address information. The configuration message may comprise a secondary path identity, such as a secondary logical channel identity. The configuration message may alternatively and/or additionally comprise a primary path identity, such as a primary logical channel identity.

At 120B, the configuration message may be transmitted to the communication device (e.g., the UE).

In some examples, a configuration status message may be received (e.g., by the second network entity) from the communication device (e.g., after and/or in response to transmission of the configuration message). A status of a secondary path (e.g., on the communication device) may be determined based upon the configuration status message. For example, the status may be indicative of complete success, partial success, and/or failure of the communication device in establishing the secondary path.

In response to determining that the status corresponds to a first status (e.g., complete success), a first operation (e.g., to facilitate use and/or interaction with the communication device based upon existence of the secondary path) may be performed. In response to determining that the status corresponds to a second status (e.g., partial success), a second operation (e.g., to facilitate use and/or interaction with the communication device based upon existence of a variation of the secondary path) may be performed. In response to determining that the status corresponds to a third status (e.g., failure), a third operation (e.g., to facilitate use and/or interaction with the communication device based upon a lack of the secondary path) may be performed.

Figure 5:
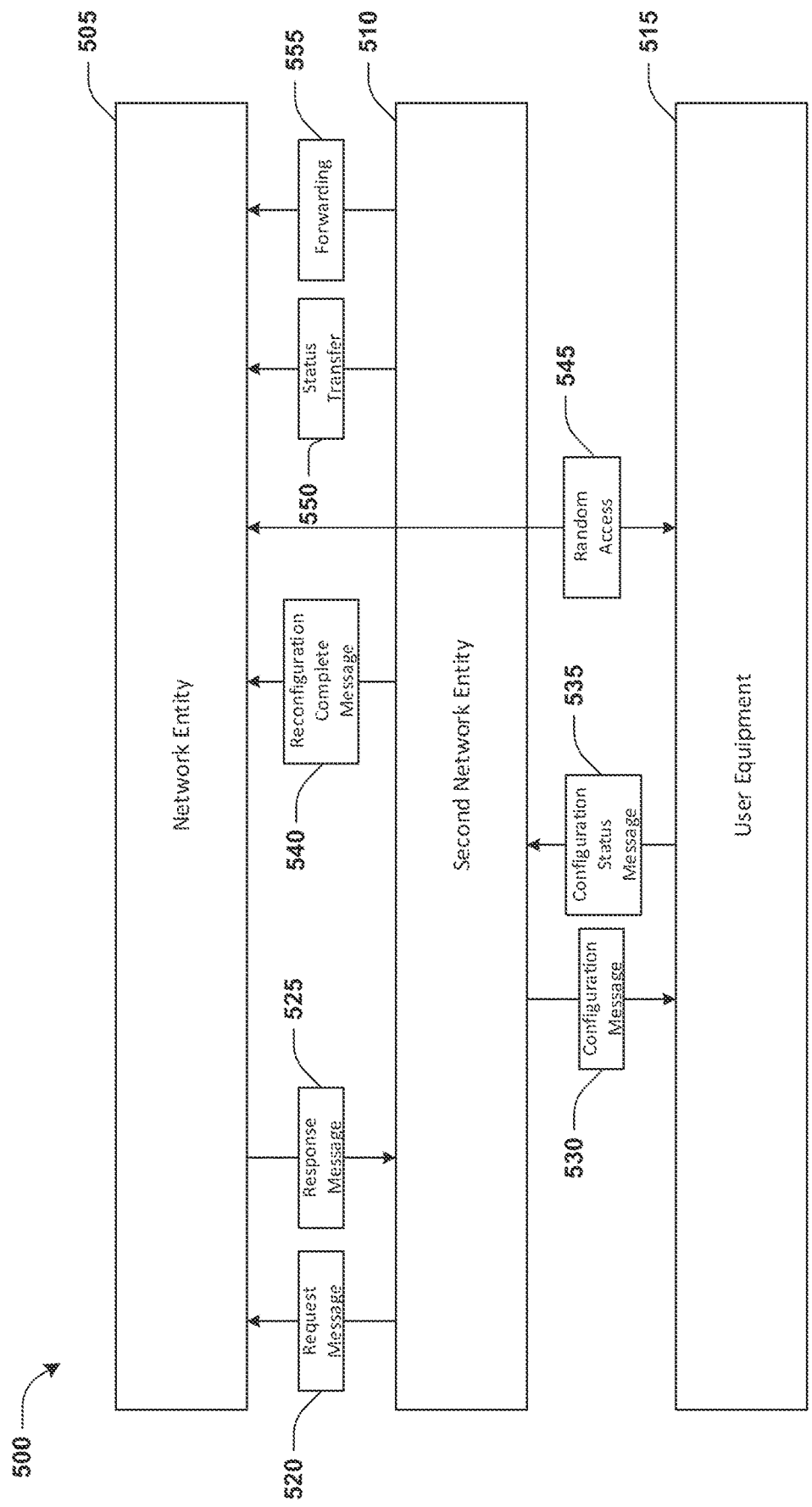
FIG. 5 is a component block diagram illustrating an example system for facilitating use of a radio bearer using a secondary path.

It may be appreciated that at least some of the modules, diagrams and/or techniques of FIG. 5 (e.g., and/or other Figs.) may be incorporated and/or implemented in the performance of method 100B.

Figure 1C:
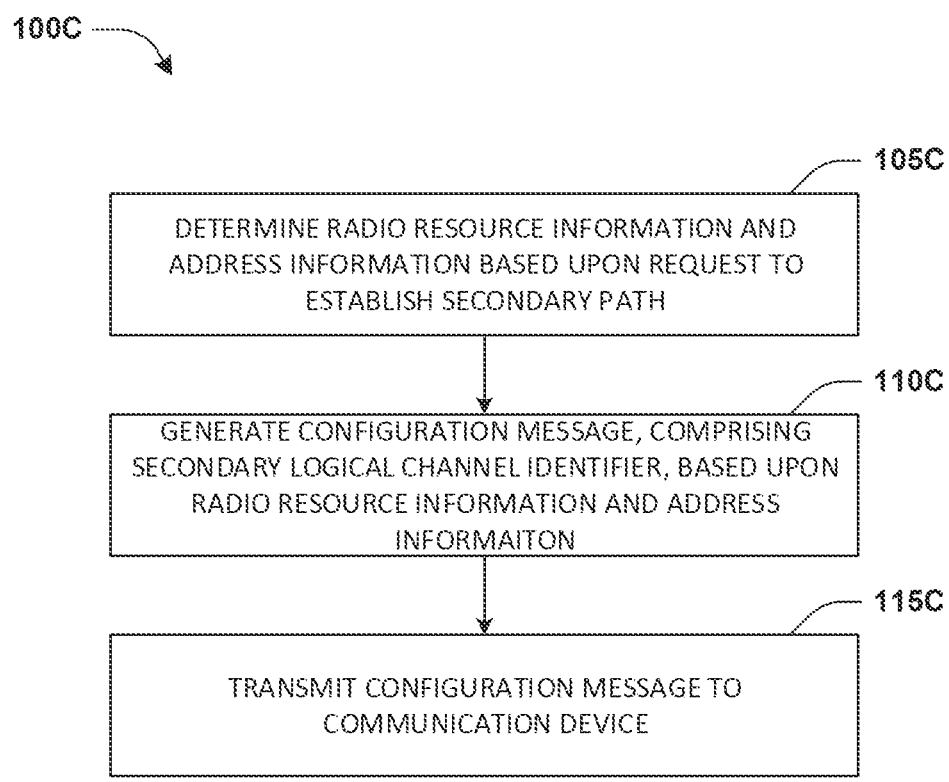
FIG. 1C is a flow chart illustrating an example method for facilitating use of a radio bearer using a secondary path.

An example method 100C of facilitating use of a radio bearer using a secondary path is illustrated in FIG. 1C. Accordingly, at 105C, radio resource information and/or address information may be determined based upon a request to establish a secondary path associated with a radio bearer. The request may comprise an indication of a communication device (e.g., a UE) upon which the secondary path is to be established (e.g., and/or modified).

At 110C, a configuration message may be generated based upon the radio resource information and/or the address information. The configuration message may comprise a secondary path identity, such as a secondary logical channel identity. The configuration message may alternatively and/or additionally comprise a primary path identity, such as a primary logical channel identity. The request may be generated by a second network entity that generates the configuration message and/or may be received by a network entity from the second network entity.

At 115C, the configuration message may be transmitted from the network entity to the communication device (e.g., the UE).

It may be appreciated that at least some of the modules, diagrams and/or techniques of FIG. 5 (e.g., and/or other Figs.) may be incorporated and/or implemented in the performance of method 100C.

Figure 2A:
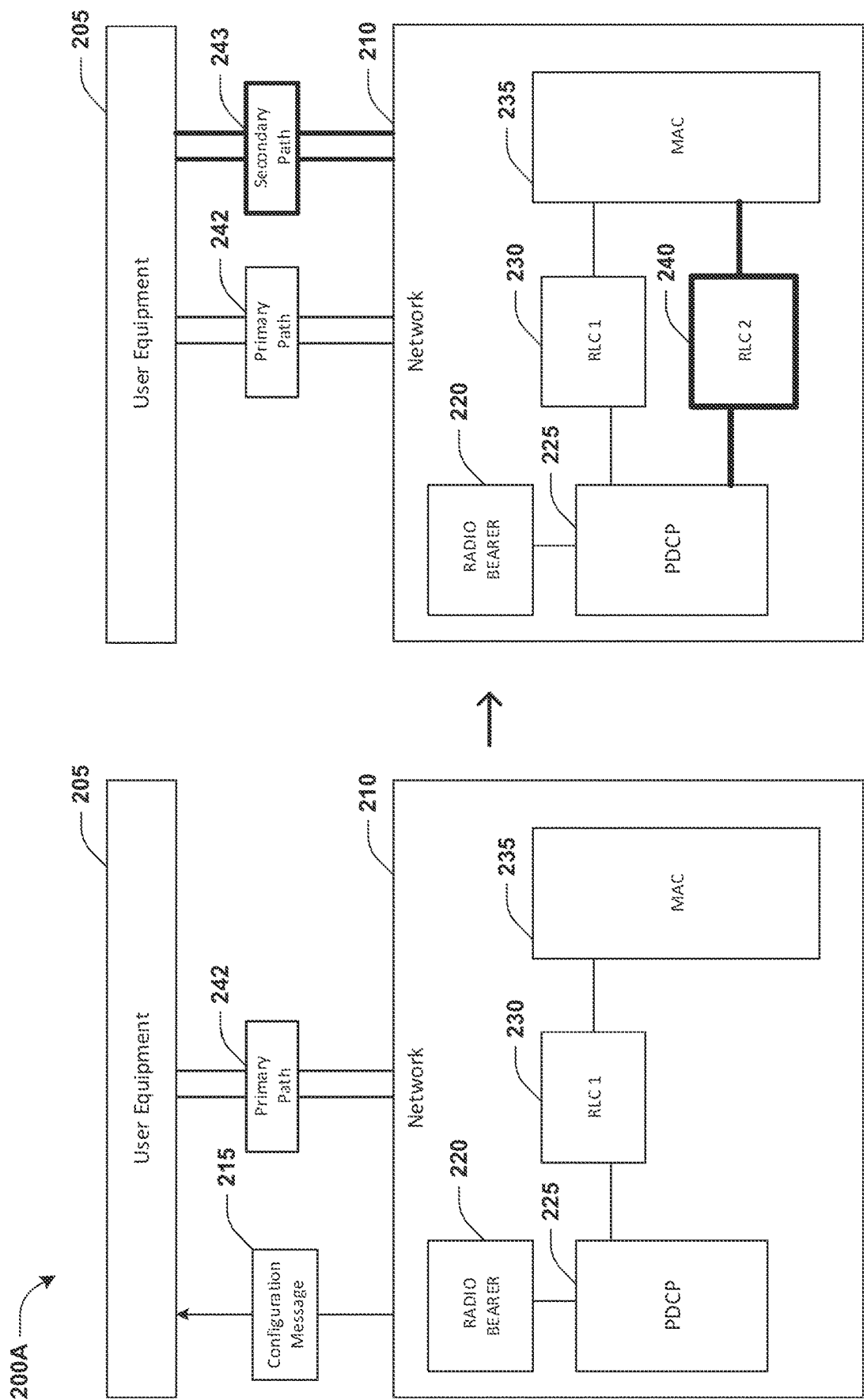
FIG. 2A is a component block diagram illustrating an example system for facilitating use of a radio bearer using a secondary path.

FIG. 2A illustrates an example of a system 200A for facilitating use of a radio bearer using a secondary path. A communication device 205 (e.g., a UE) and/or a network entity 210 (e.g., one or more base stations and/or a network) may communicate with one another. The network entity 210 may comprise one or more components and/or entities, such as a radio bearer 220, a PDCP entity 225, a primary RLC entity 230, and/or a medium access control (MAC) entity 235 (e.g., one or more of which may be associated with a service). The communication device 205 may comprise (e.g., and/or be connected to the network entity 210 via) a primary path 242, which may be associated with (e.g., facilitated by) the primary RLC entity 230.

The network entity 210 may transmit a configuration message 215 to the communication device 205. The configuration message 215 may comprise a secondary path identity, such as a secondary logical channel identity, a primary path identity, such as a primary logical channel identity, a radio bearer identity, one or more (e.g., other) parameters, and/or one or more instructions.

The communication device 205 may receive and analyze the configuration message 215 to identify one or more identities, parameters and/or instructions. The communication device 205 may use the secondary logical channel identity of the configuration message 215 to determine (e.g., calculate one or more dimensions and/or aspects of) a secondary path (e.g., to the network entity 210, and/or to another network entity that does not have the radio bearer). In some examples, the communication device 205 may use the primary logical channel identity of the configuration message 215 to determine (e.g., calculate one or more dimensions and/or aspects of) a primary path.

The communication device 205 may determine whether the secondary path determined based upon the secondary logical channel identity is present (e.g., and operating) in the communication device 205 (e.g., such that the secondary path connects the communication device 205 to the network entity 210). The determination may be made based upon one or more parameters comprised in the configuration message 215 and/or may be made by searching one or more portions of the communication device 205 for the secondary path and/or for one or more indicators associated with the secondary path. Alternatively and/or additionally, the determination may be based upon a number of paths determined to be between the communication device 205 and the network entity 210. Alternatively and/or additionally, the determination may be based upon a number of paths determined to be between a first component of the network entity 210, such as the radio bearer 220, and a second component of the network entity 210, such as the MAC entity 235.

The communication device 205 may determine that the secondary path is not present in the communication device 205 (e.g., such that the secondary path does not connect the communication device 205 to the network entity 210). In response, the secondary path 243 may be established (e.g., generated) in the communication device 205 such that the secondary path connects the communication device 205 to the network entity 210. A secondary RLC entity 240 may be established in the network entity 210 in association with (e.g., to facilitate) the secondary path 243. For example, the secondary RLC entity 240 may connect the PDCP 225 and/or the radio bearer 220 to the MAC entity 235 (e.g., in addition to the existing primary RLC entity 230).

In some examples, in response to determining that the secondary path is not present in the communication device 205, the radio bearer 220, the PDCP 225, the primary RLC entity 230, the primary path 242, a mapping between the secondary path 243 and the radio bearer 220, the MAC entity 235 and/or one or more other components of the network entity 210 and/or the communication device 205 may be generated and/or modified in accordance with the (e.g., newly established) secondary path 243.

Figure 2B:
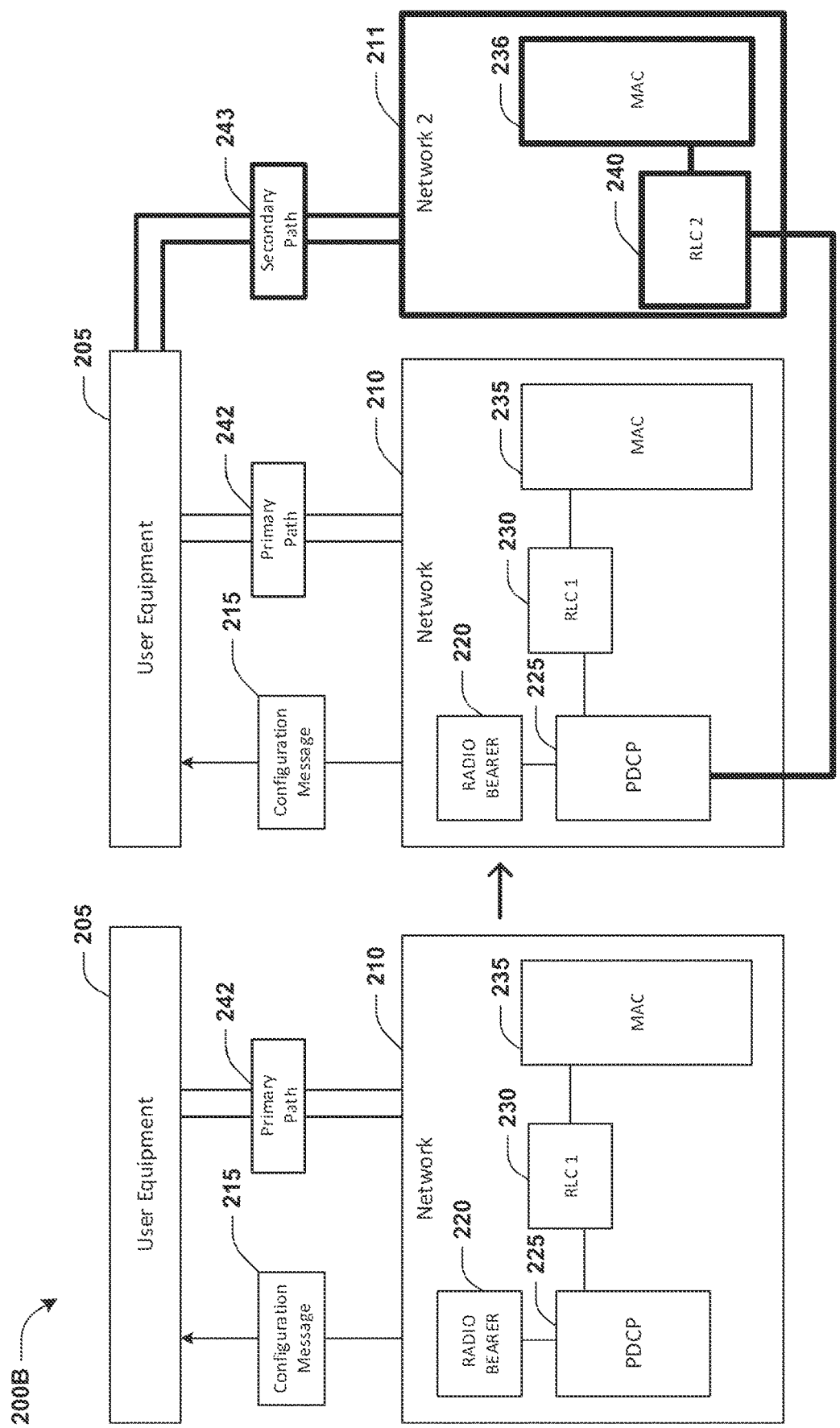
FIG. 2B is a component block diagram illustrating an example system for facilitating use of a radio bearer using a secondary path.

FIG. 2B illustrates an example of a system 200B for facilitating use of a radio bearer using a secondary path. A communication device 205 (e.g., a UE) and/or a network entity 210 (e.g., one or more base stations and/or a network) may communicate with one another. The network entity 210 may comprise one or more components and/or entities, such as a radio bearer 220, a PDCP entity 225, a primary RLC entity 230, and/or a medium access control (MAC) entity 235 (e.g., one or more of which may be associated with a service). The communication device 205 may comprise (e.g., and/or be connected to the network entity 210 via) a primary path 242, which may be associated with (e.g., facilitated by) the primary RLC entity 230.

The network entity 210 may transmit a configuration message 215 to the communication device 205. The configuration message 215 may comprise a secondary path identity, such as a secondary logical channel identity, a primary path identity, such as a primary logical channel identity, a radio bearer identity, one or more (e.g., other) parameters, and/or one or more instructions.

The communication device 205 may receive and analyze the configuration message 215 to identify one or more identities, parameters and/or instructions. The communication device 205 may use the secondary logical channel identity of the configuration message 215 to determine (e.g., calculate one or more dimensions and/or aspects of) a secondary path to a second network entity 211 (e.g., that does not have the radio bearer). In some examples, the communication device 205 may use the primary logical channel identity of the configuration message 215 to determine (e.g., calculate one or more dimensions and/or aspects of) a primary path (e.g., to the network entity 210).

The communication device 205 may determine whether the secondary path determined based upon the secondary logical channel identity is present (e.g., and operating) in the communication device 205 (e.g., such that the secondary path connects the communication device 205 to the second network entity 211). The determination may be made based upon one or more parameters comprised in the configuration message 215 and/or may be made by searching one or more portions of the communication device 205 for the secondary path and/or for one or more indicators associated with the secondary path. Alternatively and/or additionally, the determination may be based upon a number of paths determined to be between the communication device 205 and the network entity 210 and/or the second network entity 211. Alternatively and/or additionally, the determination may be based upon a number of paths determined to be between a first component of the network entity 210 and/or the second network entity 211, such as the radio bearer 220, and a second component of the network entity 210 and/or the second network entity 211, such as the MAC entity 235.

The communication device 205 may determine that the secondary path is not present in the communication device 205 (e.g., such that the secondary path does not connect the communication device 205 to the second network entity 211). In response, the secondary path 243 may be established (e.g., generated) in the communication device 205 such that the secondary path connects the communication device 205 to the second network entity 211. A secondary RLC entity 240 may be established in the second network entity 211 in association with (e.g., to facilitate) the secondary path 243. For example, the secondary RLC entity 240 may connect the PDCP 225 and/or the radio bearer 220 (e.g., in the network entity 210) to a second MAC entity 236 (e.g., in the second network entity 211).

In some examples, in response to determining that the secondary path is not present in the communication device 205, the radio bearer 220, the PDCP 225, the primary RLC entity 230, the primary path 242, a mapping between the secondary path 243 and the radio bearer 220, the MAC entity 235, the second MAC entity 236 and/or one or more other components of the network entity 210, the second network entity 211 and/or the communication device 205 may be generated and/or modified in accordance with the (e.g., newly established) secondary path 243.

Figure 3A:
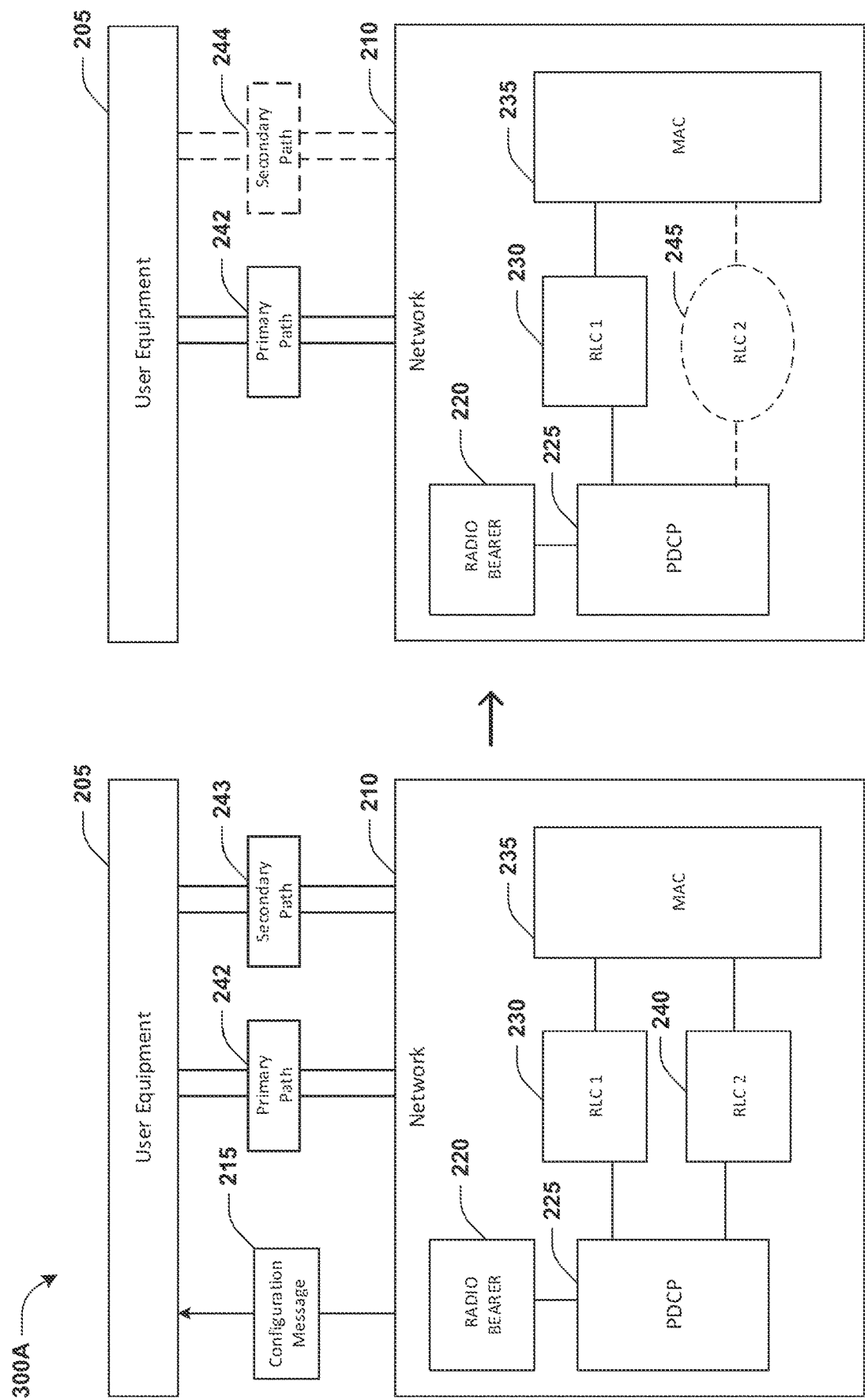
FIG. 3A is a component block diagram illustrating an example system for facilitating use of a radio bearer using a secondary path.

FIG. 3A illustrates an example of a system 300A for facilitating use of a radio bearer using a secondary path. A communication device 205 (e.g., a UE) and/or a network entity 210 (e.g., a UE) may communicate with one another. The network entity 210 may comprise one or more components and/or entities, such as a radio bearer 220, a PDCP entity 225, a primary RLC entity 230, and/or a medium access control (MAC) entity 235 (e.g., one or more of which may be associated with a service). The communication device 205 may comprise (e.g., and/or be connected to the network entity 210 via) a primary path 242, which may be associated with (e.g., facilitated by) the primary RLC entity 230.

The network entity 210 may transmit a configuration message 215 to the communication device 205. The configuration message 215 may comprise a secondary path identity, such as a secondary logical channel identity, a primary path identity, such as a primary logical channel identity, a radio bearer identity, one or more (e.g., other) parameters, and/or one or more instructions.

The communication device 205 may receive and analyze the configuration message 215 to identify one or more identities, parameters and/or instructions. The communication device 205 may use the secondary logical channel identity of the configuration message 215 to determine (e.g., calculate one or more dimensions and/or aspects of) a secondary path (e.g., to the network entity 210, and/or to another network entity that does not have the radio bearer). In some examples, the communication device 205 may use the primary logical channel identity of the configuration message 215 to determine (e.g., calculate one or more dimensions and/or aspects of) a primary path.

The communication device 205 may determine whether the secondary path determined based upon the secondary logical channel identity is present (e.g., and operating) in the communication device 205 (e.g., such that the secondary path connects the communication device 205 to the network entity 210). The determination may be made based upon one or more parameters comprised in the configuration message 215 and/or may be made by searching one or more portions of the communication device 205 for the secondary path and/or for one or more indicators associated with the secondary path. Alternatively and/or additionally, the determination may be based upon a number of paths determined to be between the communication device 205 and the network entity 210. Alternatively and/or additionally, the determination may be based upon a number of paths determined to be between a first component of the network entity 210, such as the radio bearer 220, and a second component of the network entity 210, such as the MAC entity 235.

The communication device 205 may determine that the secondary path 243 is present in the communication device 205 (e.g., such that the secondary path 243 does connect the communication device 205 to the network entity 210). In response, the secondary path 243 in the communication device 205 may be modified based upon the configuration message 215. For example, the secondary path 243 connecting the PDCP 225 and/or the radio bearer 220 to the MAC entity 235 may be modified to generate a modified secondary path 244. The modified secondary path 244 may comprise one or more parameters different than those of the secondary path 243. The one or more parameters may be based upon the configuration message 215. The modification of the secondary path 243 to generate the modified secondary path 244 may comprise modifying a mapping between the secondary path 243 and the radio bearer 220 to generate a modified mapping between the modified secondary path 244 and the radio bearer 220. The secondary RLC entity 240 may be modified to generate a modified secondary RLC entity 245 in the network entity 210 in association with (e.g., to facilitate) the modified secondary path 244. For example, the modified secondary RLC entity 245 may connect the PDCP 225 and/or the radio bearer 220 to the MAC entity 235 (e.g., in addition to the existing primary RLC entity 230).

In some examples, in response to determining that the secondary path 243 is present in the communication device 205, the radio bearer 220, the PDCP 225, the primary path 230, the MAC entity 235 and/or one or more other components of the network entity 210 and/or the communication device 205 may be added, deleted and/or modified in accordance with the modified secondary path 244.

Figure 3B:
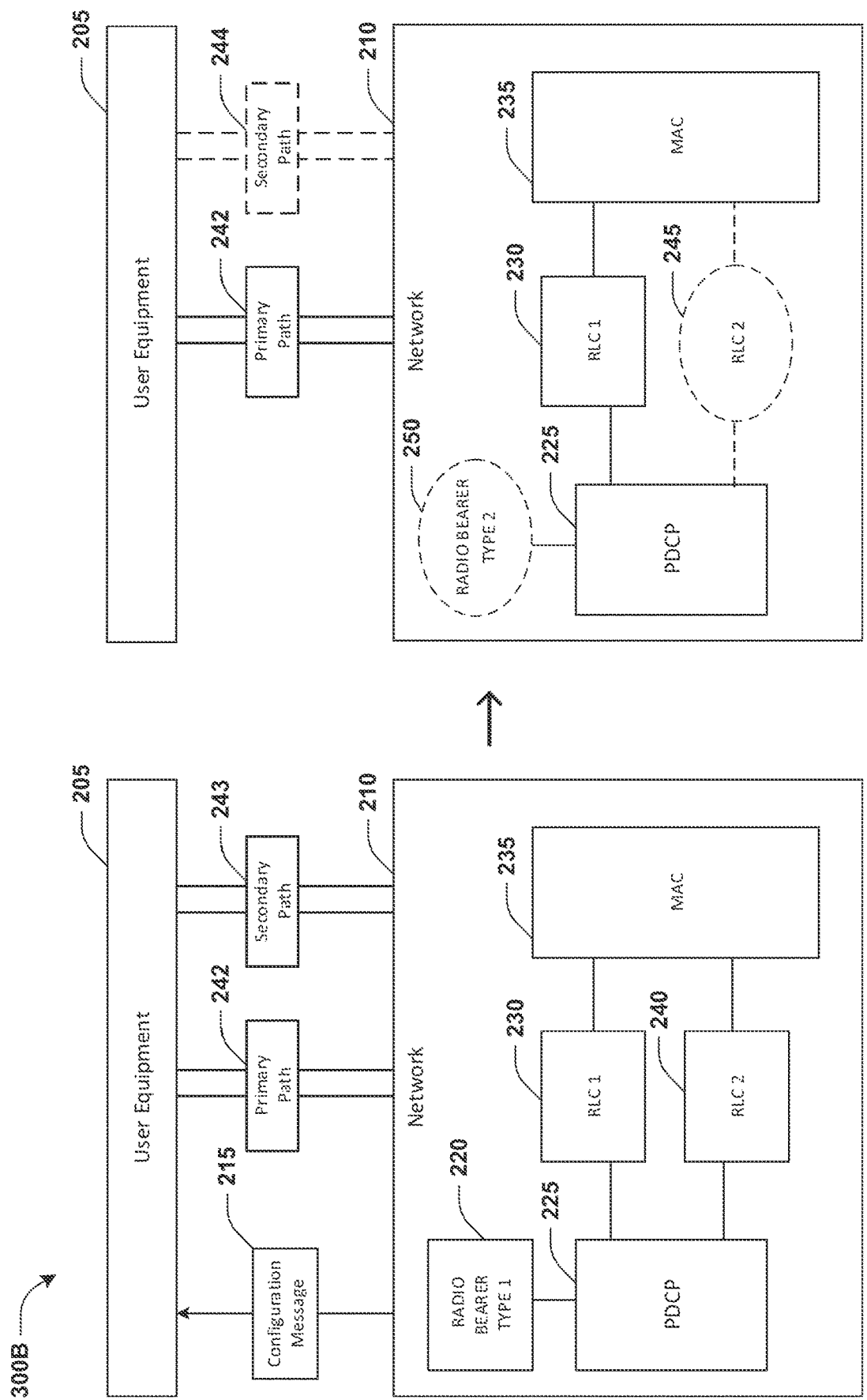
FIG. 3B is a component block diagram illustrating an example system for facilitating use of a radio bearer using a secondary path.

FIG. 3B illustrates an example of a system 300B for facilitating use of a radio bearer using a secondary path. A communication device 205 (e.g., a UE) and/or a network entity 210 (e.g., a UE) may communicate with one another. The network entity 210 may comprise one or more components and/or entities, such as a radio bearer 220, a PDCP entity 225, a primary RLC entity 230, and/or a medium access control (MAC) entity 235 (e.g., one or more of which may be associated with a service). The communication device 205 may comprise (e.g., and/or be connected to the network entity 210 via) a primary path 242, which may be associated with (e.g., facilitated by) the primary RLC entity 230.

The network entity 210 may transmit a configuration message 215 to the communication device 205. The configuration message 215 may comprise a secondary path identity, such as a secondary logical channel identity, a primary path identity, such as a primary logical channel identity, a radio bearer identity, one or more (e.g., other) parameters, and/or one or more instructions.

The communication device 205 may receive and analyze the configuration message 215 to identify one or more identities, parameters and/or instructions. The communication device 205 may use the secondary logical channel identity of the configuration message 215 to determine (e.g., calculate one or more dimensions and/or aspects of) a secondary path (e.g., to the network entity 210, and/or to another network entity that does not have the radio bearer). In some examples, the communication device 205 may use the primary logical channel identity of the configuration message 215 to determine (e.g., calculate one or more dimensions and/or aspects of) a primary path. In some examples, the communication device 205 may use a bearer identity of the configuration message 215 to determine (e.g., calculate one or more dimensions and/or aspects of) a radio bearer.

The communication device 205 may determine whether the secondary path determined based upon the secondary logical channel identity is present (e.g., and operating) in the communication device 205 (e.g., such that the secondary path connects the communication device 205 to the network entity 210). The determination may be made based upon one or more parameters comprised in the configuration message 215 and/or may be made by searching one or more portions of the communication device 205 for the secondary path and/or for one or more indicators associated with the secondary path. Alternatively and/or additionally, the determination may be based upon a number of paths determined to be between the communication device 205 and the network entity 210. Alternatively and/or additionally, the determination may be based upon a number of paths determined to be between a first component of the network entity 210, such as the radio bearer 220, and a second component of the network entity 210, such as the MAC entity 235.

The communication device 205 may determine whether the radio bearer determined based upon the bearer identity is connected to the communication device 205 and/or operating in the network entity 210. The determination may be made based upon one or more parameters comprised in the configuration message 215 and/or may be made by searching one or more portions of the communication device 205 and/or the network entity 210 for the radio bearer and/or for one or more indicators associated with the radio bearer.

The communication device 205 may determine that the secondary path 243 is present in the communication device 205 (e.g., such that the secondary path 243 does connect the communication device 205 to the network entity 210). In response, the secondary path 243 in the communication device 205 may be modified based upon the configuration message 215. For example, the secondary path 243 connecting the PDCP 225 and/or the radio bearer 220 to the MAC entity 235 may be modified to generate a modified secondary path 244.

The communication device 205 may determine that the radio bearer 220 is connected to the communication device 205 and/or operating in the network entity 210. In response, the radio bearer 220 in the network entity 210 may be modified based upon and/or in coordination with the configuration message 215. For example, the radio bearer 220 (e.g., of a first type) connected to the PDCP 225, the primary RLC entity 230, the secondary RLC entity 240 and/or the MAC entity 235 may be modified to generate a modified radio bearer 250 (e.g., of a second type).

In response to determining that the configuration message 215 comprises an instruction to change a type of the radio bearer 220 from a first bearer type to a second bearer type, one or more components of the communication device 205 may be modified from a first configuration that corresponds to the first bearer type to a second configuration that corresponds to the second bearer type.

The modified secondary path 244 may comprise one or more parameters different than those of the secondary path 243. The one or more parameters may be based upon the configuration message 215. The modified radio bearer 250 may comprise one or more parameters different than those of the radio bearer 220. The one or more parameters may be based upon the configuration message 215. The first configuration may comprise one or more parameters different than those of the second configuration. The one or more parameters may be based upon the configuration message 215.

The modification of the secondary path 243 to generate the modified secondary path 244 may comprise modifying a mapping between the secondary path 243 and the radio bearer 220 to generate a modified mapping between the modified secondary path 244 and the modified radio bearer 250. The secondary RLC entity 240 may be modified to generate a modified secondary RLC entity 245 in the network entity 210 in association with (e.g., to facilitate) the modified secondary path 244 and/or the modified radio bearer 250. For example, the modified secondary RLC entity 245 may connect the PDCP 225 and/or the modified radio bearer 250 to the MAC entity 235 (e.g., in addition to the existing primary RLC entity 230).

The radio bearer 220 may be a first type of radio bearer, while the modified radio bearer 250 may be a second type of radio bearer (e.g., different than the first type of radio bearer). The first type and/or the second type of radio bearer may comprise and/or be based upon a master cell group (MCG) bearer, a secondary cell group (SCG) bearer, an MCG split bearer, an SCG split bearer, an MCG duplicated bearer, an SCG duplicated bearer, an MCG anchored bearer and/or an SCG anchored bearer.

In some examples, in response to determining that the secondary path 243 and/or the radio bearer 220 is present in the communication device 205, the PDCP 225, the primary path 230, the MAC entity 235 and/or one or more other components of the network entity 210 and/or the communication device 205 may be added, deleted and/or modified in accordance with the modified secondary path 244 and/or the modified radio bearer 250.

Figure 4A:
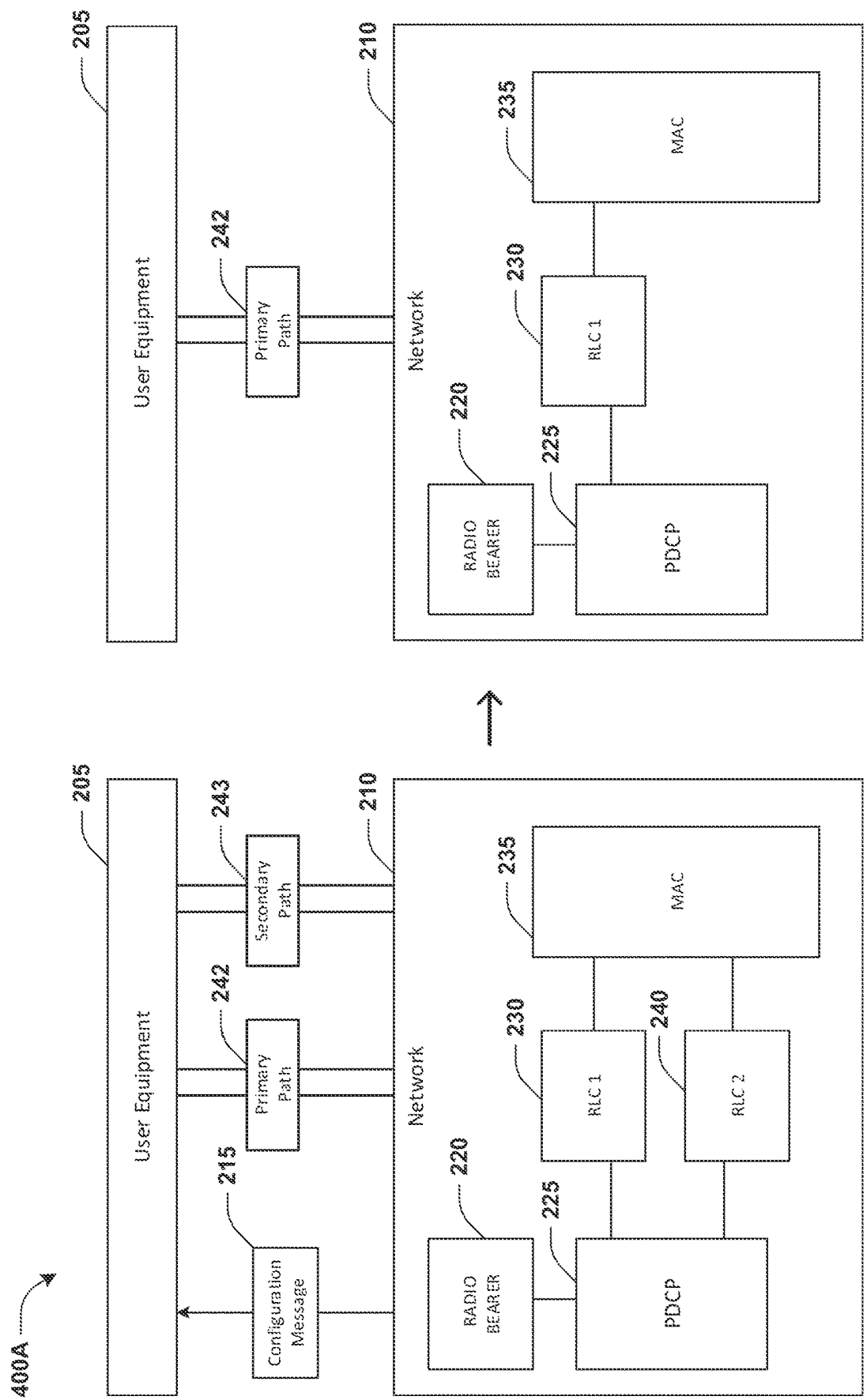
FIG. 4A is a component block diagram illustrating an example system for facilitating use of a radio bearer using a secondary path.

FIG. 4A illustrates an example of a system 400A for facilitating use of a radio bearer using a secondary path. A communication device 205 (e.g., a UE) and/or a network entity 210 (e.g., a UE) may communicate with one another. The network entity 210 may comprise one or more components and/or entities, such as a radio bearer 220, a PDCP entity 225, a primary RLC entity 230, and/or a medium access control (MAC) entity 235 (e.g., one or more of which may be associated with a service). The communication device 205 may comprise (e.g., and/or be connected to the network entity 210 via) a primary path 242, which may be associated with (e.g., facilitated by) the primary RLC entity 230.

The network entity 210 may transmit a configuration message 215 to the communication device 205. The configuration message 215 may comprise a secondary path identity, such as a secondary logical channel identity, a primary path identity, such as a primary logical channel identity, a radio bearer identity, one or more (e.g., other) parameters, and/or one or more instructions.

The communication device 205 may receive and analyze the configuration message 215 to identify one or more identities, parameters and/or instructions. The communication device 205 may use the secondary logical channel identity of the configuration message 215 to determine (e.g., calculate one or more dimensions and/or aspects of) a secondary path (e.g., to the network entity 210, and/or to another network entity that does not have the radio bearer). In some examples, the communication device 205 may use the primary logical channel identity of the configuration message 215 to determine (e.g., calculate one or more dimensions and/or aspects of) a primary path.

The communication device 205 may determine whether the secondary path determined based upon the secondary logical channel identity is present (e.g., and operating) in the communication device 205 (e.g., such that the secondary path connects the communication device 205 to the network entity 210). The determination may be made based upon one or more parameters comprised in the configuration message 215 and/or may be made by searching one or more portions of the communication device 205 for the secondary path and/or for one or more indicators associated with the secondary path. Alternatively and/or additionally, the determination may be based upon a number of paths determined to be between the communication device 205 and the network entity 210. Alternatively and/or additionally, the determination may be based upon a number of paths determined to be between a first component of the network entity 210, such as the radio bearer 220, and a second component of the network entity 210, such as the MAC entity 235.

The communication device 205 may determine that the secondary path 243 is present in the communication device 205 (e.g., such that the secondary path 243 does connect the communication device 205 to the network entity 210). In response, the secondary path 243 in the communication device 205 may be deleted based upon the configuration message 215. For example, the configuration message 215 may comprise an instruction to release the secondary path 243 and/or an instruction to delete one or more radio bearers linked to the secondary path 243. The secondary path 243 connecting the communication device 205 to the network entity 210 may be removed from the communication device 205 and/or cease to connect the communication device 205 to the network entity 210. Alternatively and/or additionally, the secondary RLC entity 240 connecting the PDCP 225 and/or the radio bearer 220 to the MAC entity 235 may be removed from the network entity 210 and/or cease to connect the PDCP 225 and/or the radio bearer 220 to the MAC entity 235.

In some examples, in response to determining that the secondary path 243 is present in the communication device 205, the PDCP 225, the primary path 230, the MAC entity 235 and/or one or more other components of the network entity 210 may be added, deleted and/or modified in accordance with deletion of the secondary path 243.

Figure 4B:
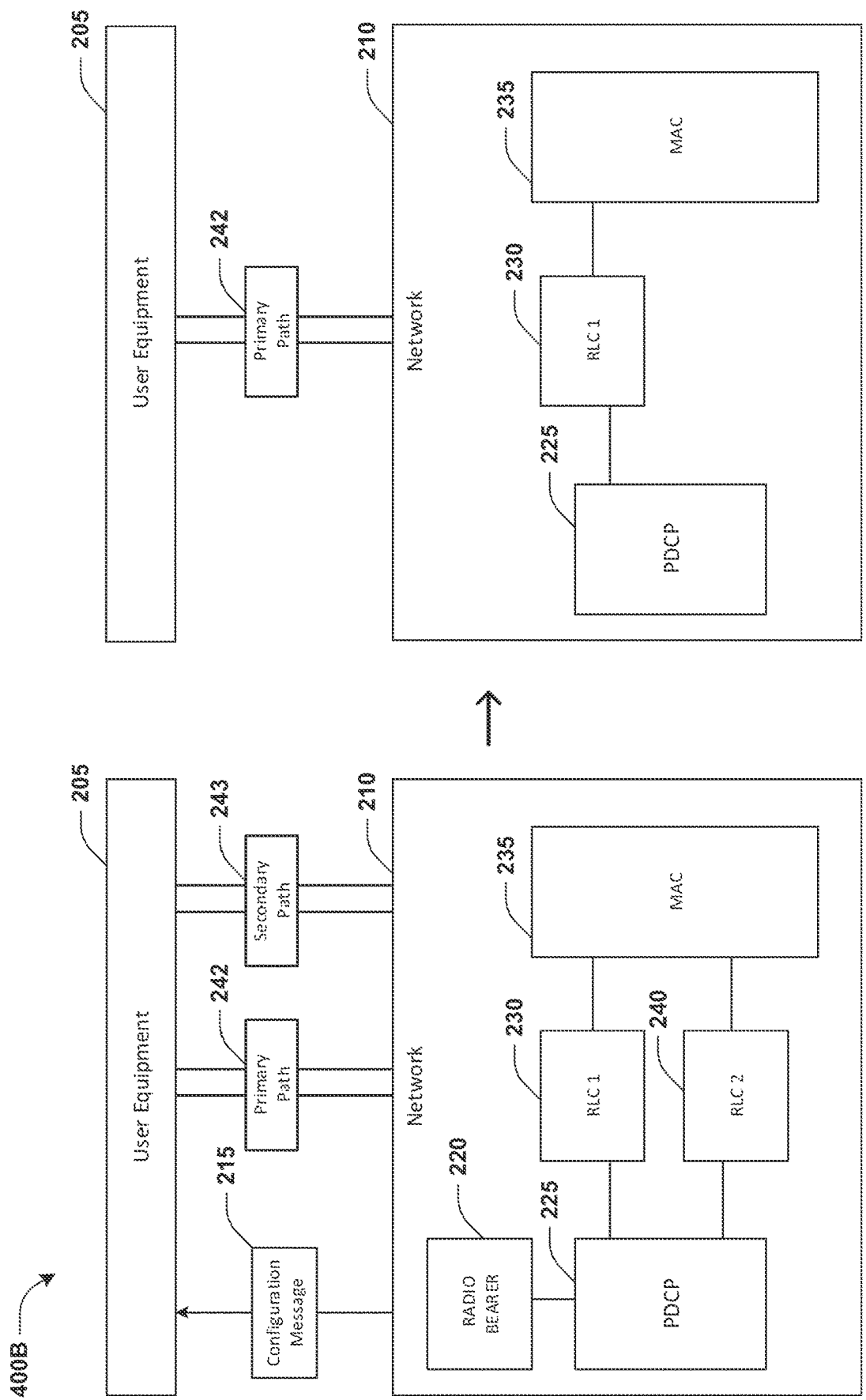
FIG. 4B is a component block diagram illustrating an example system for facilitating use of a radio bearer using a secondary path.

FIG. 4B illustrates an example of a system 400B for facilitating use of a radio bearer using a secondary path. A communication device 205 (e.g., a UE) and/or a network entity 210 (e.g., a UE) may communicate with one another. The network entity 210 may comprise one or more components and/or entities, such as a radio bearer 220, a PDCP entity 225, a primary RLC entity 230, and/or a medium access control (MAC) entity 235 (e.g., one or more of which may be associated with a service). The communication device 205 may comprise (e.g., and/or be connected to the network entity 210 via) a primary path 242, which may be associated with (e.g., facilitated by) the primary RLC entity 230.

The network entity 210 may transmit a configuration message 215 to the communication device 205. The configuration message 215 may comprise a secondary path identity, such as a secondary logical channel identity, a primary path identity, such as a primary logical channel identity, a radio bearer identity, one or more (e.g., other) parameters, and/or one or more instructions.

The communication device 205 may receive and analyze the configuration message 215 to identify one or more identities, parameters and/or instructions. The communication device 205 may use the secondary logical channel identity of the configuration message 215 to determine (e.g., calculate one or more dimensions and/or aspects of) a secondary path (e.g., to the network entity 210, and/or to another network entity that does not have the radio bearer). In some examples, the communication device 205 may use the primary logical channel identity of the configuration message 215 to determine (e.g., calculate one or more dimensions and/or aspects of) a primary path. In some examples, the communication device 205 may use a bearer identity of the configuration message 215 to determine (e.g., calculate one or more dimensions and/or aspects of) a radio bearer.

The communication device 205 may determine whether the secondary path determined based upon the secondary logical channel identity is present (e.g., and operating) in the communication device 205 (e.g., such that the secondary path connects the communication device 205 to the network entity 210). The determination may be made based upon one or more parameters comprised in the configuration message 215 and/or may be made by searching one or more portions of the communication device 205 for the secondary path and/or for one or more indicators associated with the secondary path. Alternatively and/or additionally, the determination may be based upon a number of paths determined to be between the communication device 205 and the network entity 210. Alternatively and/or additionally, the determination may be based upon a number of paths determined to be between a first component of the network entity 210, such as the radio bearer 220, and a second component of the network entity 210, such as the MAC entity 235.

The communication device 205 may determine whether the radio bearer determined based upon the bearer identity is connected to the communication device 205 and/or operating in the network entity 210. The determination may be made based upon one or more parameters comprised in the configuration message 215 and/or may be made by searching one or more portions of the communication device 205 and/or the network entity 210 for the radio bearer and/or for one or more indicators associated with the radio bearer.

The communication device 205 may determine that the secondary path 243 is present in the communication device 205 (e.g., such that the secondary path 243 does connect the communication device 205 to the network entity 210). In response, the secondary path 243 in the communication device 205 may be deleted based upon the configuration message 215. For example, the configuration message 215 may comprise an instruction to release the secondary path 243 and/or an instruction to delete one or more radio bearers linked to the secondary path 243. The secondary path 243 connecting the communication device 205 to the network entity 210 may be removed from the communication device 205 and/or cease to connect the communication device 205 to the network entity 210. Alternatively and/or additionally, the secondary RLC entity 240 connecting the PDCP 225 and/or the radio bearer 220 to the MAC entity 235 may be removed from the network entity 210 and/or cease to connect the PDCP 225 and/or the radio bearer 220 to the MAC entity 235.

The communication device 205 may determine that the radio bearer 220 is connected to the communication device 205 and/or operating in the network entity 210. In response, the radio bearer 220 in the network entity 210 may be deleted based upon and/or in coordination with the configuration message 215.

In response to determining that the configuration message 215 comprises an instruction to delete the radio bearer 220, one or more components of the communication device 205 may be deleted and/or modified from a first configuration that corresponds to the radio bearer 220 to a second configuration that corresponds to a second bearer type and/or no radio bearer.

In some examples, in response to determining that the secondary path 243 and/or the radio bearer 220 is present in the communication device 205, the PDCP 225, the primary path 230, the MAC entity 235 and/or one or more other components of the network entity 210 and/or the communication device 205 may be added, deleted and/or modified in accordance with deletion of the radio bearer 220 and/or the secondary path 243.

FIG. 5 illustrates an example of a system 500 for facilitating use of a radio bearer using a secondary path. A network entity 505 (e.g., a first base station in a network) (e.g., an SgNB), a second network entity 510 (e.g., a second base station in the network) (e.g., an MeNB) and/or a communication device 515 (e.g., a UE) may communicate with one another.

The second network entity 510 may transmit, to the network entity 505, a request message 520 to establish (e.g. and/or modify) a secondary path and/or a radio bearer. The request message 520 may comprise an indication of the communication device 515 upon which the secondary path and/or the radio bearer is to be established (e.g., and/or modified), information about the radio bearer, (e.g., data forwarding) address information and/or capability coordination information corresponding to the communication device 515. The request message 520 (e.g., and/or one or more other messages sent from the second network entity 510 to the network entity 505) may comprise X2 downlink (DL) transport network layer (TNL) addresses for one or more (e.g., E-UTRAN) radio access bearers (RABs) and/or an indication of a (e.g., maximum) quality of service (QoS) level that the second network entity 510 is capable of supporting.

The network entity 505 may transmit a response message 525 to the second network entity 510 (e.g., in response to the request message 520). The response message 525 may comprise an acknowledgement of the request message 520 and/or one or more parameters (e.g., associated with the communication device 515) such as radio resource information and/or address information (e.g., for use in establishing a new secondary path in an existing (e.g., MCG) anchor bearer). The address information may comprise an X2 downlink (DL) transport network layer (TNL) address.

The second network entity 510 may generate a configuration message 530 corresponding to the secondary path and/or the radio bearer (e.g., in response to the response message 525). The configuration message 530 may be generated using at least some of the response message 525, such as the radio resource information, the address information, etc. The configuration message 530 may comprise a secondary path identity, such as a secondary logical channel identity, a primary path identity, such as a primary logical channel identity, a bearer identity, one or more parameters, and/or one or more instructions.

The second network entity 510 may transmit the configuration message 530 to the communication device 515. The communication device 515 may analyze the configuration message 530 to identify one or more identities, parameters and/or instructions. The communication device 515 may use the secondary logical channel identity of the configuration message 530 to determine (e.g., calculate one or more dimensions and/or aspects of) a secondary path. In some examples, the communication device 515 may use the primary logical channel identity of the configuration message 530 to determine (e.g., calculate one or more dimensions and/or aspects of) a primary path. In some examples, the communication device 515 may use a bearer identity of the configuration message 530 to determine (e.g., calculate one or more dimensions and/or aspects of) a radio bearer.

The communication device 515 may determine whether the secondary path determined based upon the secondary logical channel identity is present (e.g., and operating) in the communication device 515 (e.g., such that the secondary path connects the communication device 515 to the network entity 505, the second network entity 510 and/or one or more other network entities). The determination may be made (i) based upon one or more parameters comprised in the configuration message 530, (ii) searching one or more portions of the communication device 515 for the secondary path and/or for one or more indicators associated with the secondary path, (iii) based upon a number of paths determined to be between the communication device 515 and the network entity 505, the second network entity 510 and/or one or more other network entities and/or (iv) based upon a number of paths determined to be between a first component of the communication device 515 and/or the second network entity 510 and a second component of the communication device 515 and/or the second network entity 510.

The communication device 515 may determine whether the radio bearer determined based upon the bearer identity is present (e.g., and operating) in the communication device 515 and/or the second network entity 510. The determination may be made based upon one or more parameters comprised in the configuration message 530 and/or may be made by searching one or more portions of the communication device 515 and/or the second network entity 510 for the radio bearer and/or for one or more indicators associated with the radio bearer.

In response to the communication device 515 determining that the secondary path and/or the radio bearer is present (e.g., and operating) in the communication device 515 and/or the second network entity 510, the radio bearer and/or the secondary path in the communication device 515 and/or the second network entity 510 may be modified based upon the configuration message 530.

In response to the communication device 515 determining that the secondary path and/or the radio bearer is not present (e.g., and operating) in the communication device 515 and/or the second network entity 510, the radio bearer and/or the secondary path in the communication device 515 may be established (e.g., generated) in the communication device 515 and/or the second network entity 510 based upon the configuration message 530.

The communication device 515 may generate a configuration status message 535 corresponding to whether the secondary path and/or the radio bearer were determined to be present and/or one or more actions taken in association therewith. The configuration status message 535 may be generated using at least some of the response message 525, such as the radio resource information, the address information, etc. The configuration status message 535 may comprise a status of the secondary path, the radio bearer and/or instructions of the configuration message 530. For example, the status may be indicative of complete success, partial success, and/or failure of the communication device 515 in establishing and/or modifying the secondary path and/or the radio bearer.

The communication device 515 may transmit the configuration status message 535 to the second network entity 510. The second network entity 510 may analyze the configuration status message 535 to determine the status of the secondary path, the radio bearer and/or the instructions of the configuration message 530.

In response to determining that the status corresponds to a first status (e.g., complete success), the second network entity 510 (e.g., and/or one or more other network entities) may perform a first operation (e.g., to facilitate use and/or interaction with the communication device 515 based upon existence of the secondary path). In response to determining that the status corresponds to a second status (e.g., partial success), the second network entity 510 (e.g., and/or one or more other network entities) may perform a second operation (e.g., to facilitate use and/or interaction with the communication device 515 based upon existence of a variation of the secondary path). In response to determining that the status corresponds to a third status (e.g., failure), the second network entity 510 (e.g., and/or one or more other network entities) may perform a third operation (e.g., to facilitate use and/or interaction with the communication device 515 based upon a lack of the secondary path).

The second network entity 510 may generate a reconfiguration complete message 540 corresponding to the configuration status message 535 and/or whether the secondary path and/or the radio bearer were determined to be present and/or one or more actions taken in association therewith. For example, the reconfiguration complete message 540 may indicate whether reconfiguration of the communication device 515 in accordance with the configuration message 530, the request message 520 and/or the response message 525 has been successfully performed.

The second network entity 510 may transmit the reconfiguration complete message 540 to the network entity 505. A random access procedure 545 and/or synchronization may be performed between (e.g., a Primary SCell of) the network entity 505 and the communication device 515. The communication device 515 may perform uplink transmissions using the modified configuration (e.g., resulting from implementation of the configuration message 530).

The second network entity 510 may transmit status transfer information 550 to the network entity 505, and/or may transmit forwarding information 555 to the network entity 505. The forwarding information 555 may comprise a bearer context corresponding to the radio bearer of the communication device 515. In some examples, a path update may be performed across the network entity 505, the second network entity 510, the communication device 515 and/or one or more other network entities.

Figure 6A:
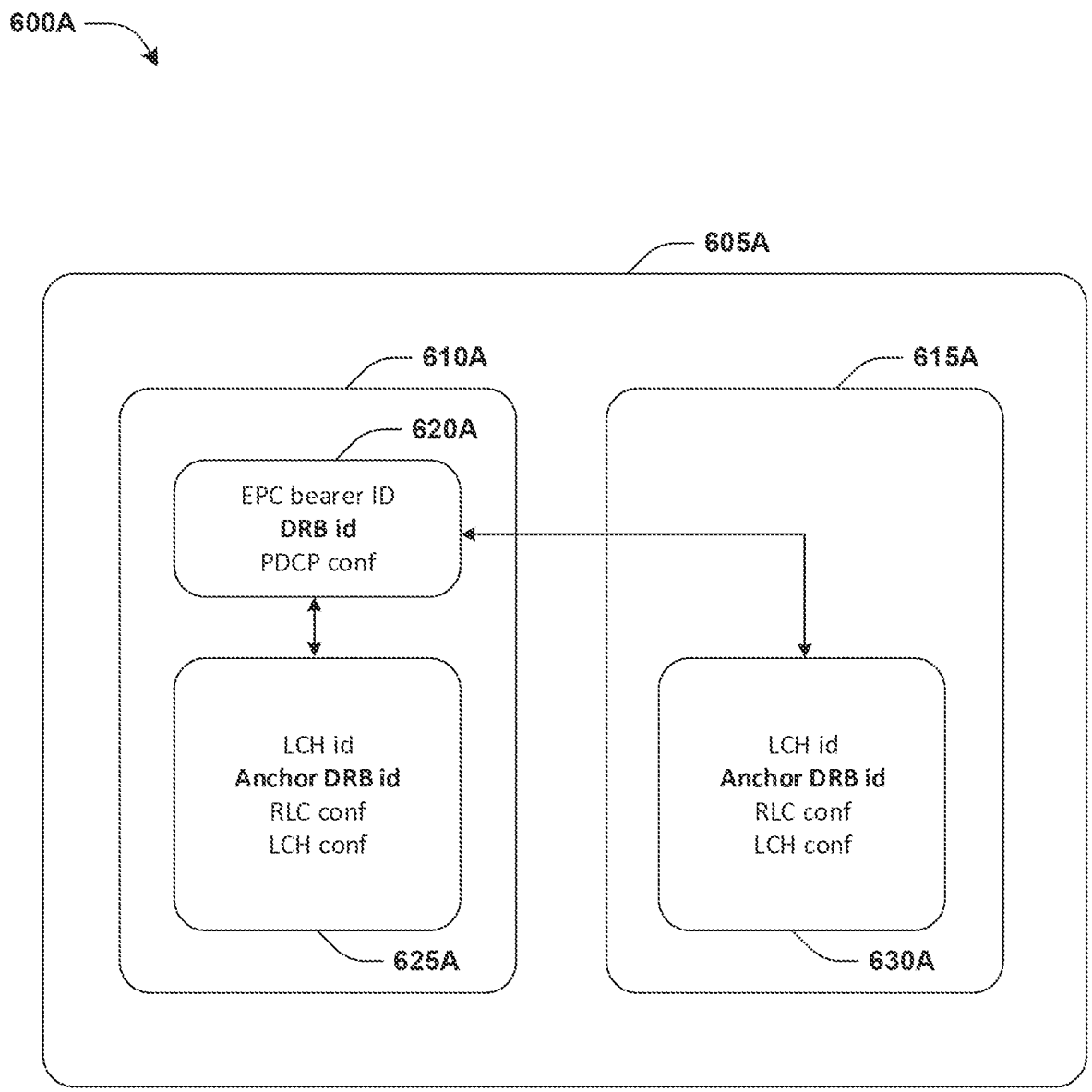
FIG. 6A is a component block diagram illustrating an example system for facilitating use of a radio bearer using a secondary path.

FIG. 6A illustrates an example of a system 600A with a control plane of a radio bearer 605A that may be used by a communication device (e.g., a UE) using a secondary path. The representation of the radio bearer 605A may comprise a first representation of a first logical channel 610A corresponding to a radio resource control (RRC) configuration associated with a first communication standard and a second representation of a second logical channel 615A corresponding to an RRC configuration associated with a second communication standard. For example, the first logical channel 610A may correspond to a Long-Term Evolution (LTE) RRC configuration and/or the second logical channel 615A may correspond to a 5G New Radio (NR) RRC configuration.

The first logical channel 610A may comprise a (e.g., data) radio bearer configuration 620A, which may comprise an (e.g., EPC) bearer identity, a (e.g., data) radio bearer identity and/or PDCP configuration information. The first logical channel 610A may alternatively and/or additionally comprise a first logical channel configuration 625A, which may comprise a first logical channel identity (e.g., of the first logical channel 610A), an anchor (e.g., data) radio bearer identity, RLC configuration information and/or first logical channel configuration information. Notably, the radio bearer configuration 620A may be separate from the first logical channel configuration 625A. However, at least some of the radio bearer configuration 620A may be associated with (e.g., linked to) the first logical channel configuration 625A based upon the (e.g., data) radio bearer identity (e.g., which may be comprised in both configurations).

The second logical channel 615A may comprise a second logical channel configuration 630A, which may comprise a second logical channel identity (e.g., of the second logical channel 615A), an anchor (e.g., data) radio bearer identity, RLC configuration information and/or second logical channel configuration information. In some examples, at least some of the second logical channel configuration 630A is different than at least some of the first logical channel configuration 625A. In some examples, at least some of the second logical channel configuration 630A is the same as at least some of the first logical channel configuration 625A. In some examples, the second logical channel 615A may not comprise a radio bearer configuration. In some examples, the second logical channel 615A may comprise a second radio bearer configuration. In some examples, the second radio bearer configuration may be the same as the radio bearer configuration 620A. In some examples, the second radio bearer configuration may be different than the radio bearer configuration 620A.

Figure 6B:
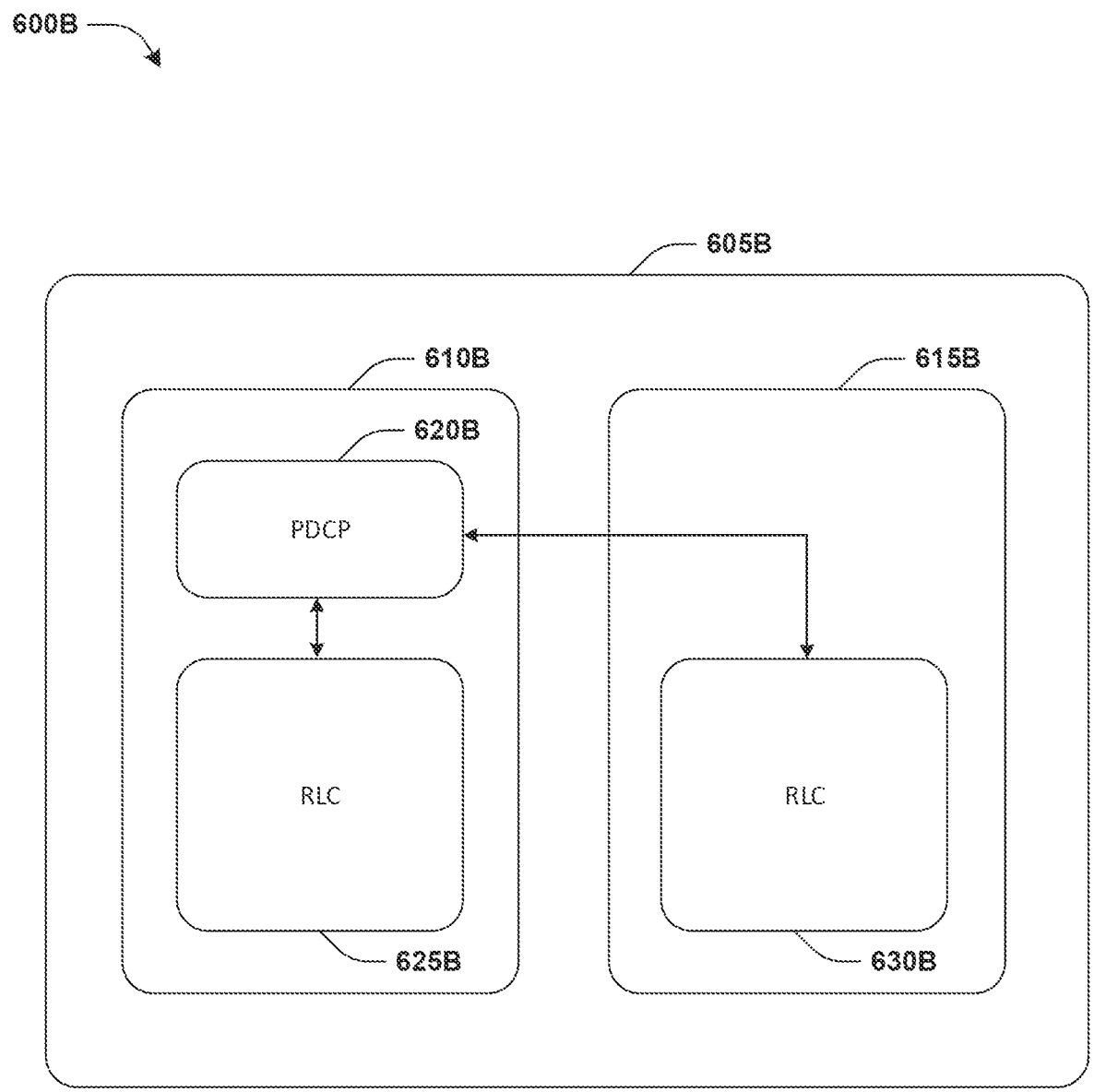
FIG. 6B is a component block diagram illustrating an example system for facilitating use of a radio bearer using a secondary path.

FIG. 6B illustrates an example of a system 600B with a user plane of a radio bearer 605A that may be used by a communication device (e.g., a UE) using a secondary path. The representation of the radio bearer 605B may comprise a first representation of a first logical channel 610B corresponding to a RRC configuration associated with a first communication standard and a second representation of a second logical channel 615B corresponding to an RRC configuration associated with a second communication standard. For example, the first logical channel 610B may correspond to a LTE RRC configuration and/or the second logical channel 615B may correspond to a NR RRC configuration.

The first logical channel 610B may comprise a (e.g., data) radio bearer configuration 620B, which may comprise PDCP configuration information (e.g., which may be mapped to a PDCP entity). The first logical channel 610B may alternatively and/or additionally comprise a first logical channel configuration 625B, which may comprise RLC configuration information. When the RLC configuration information comprises configurations that can be mapped to two or more RLC entities, unacknowledged mode (UM) may be implemented. When the RLC configuration information comprises configurations that can be mapped to (e.g., merely) one RLC entity, acknowledged mode (AM) may be implemented. Notably, the radio bearer configuration 620B may be separate from the first logical channel configuration 625B.

The second logical channel 615B may comprise a second logical channel configuration 630B, which may comprise RLC configuration information. When the RLC configuration information comprises configurations that can be mapped to two or more RLC entities, UM may be implemented. When the RLC configuration information comprises configurations that can be mapped to (e.g., merely) one RLC entity, AM may be implemented. In some examples, at least some of the second logical channel configuration 630B is different than at least some of the first logical channel configuration 625B. In some examples, at least some of the second logical channel configuration 630B is the same as at least some of the first logical channel configuration 625B.

Figure 7:
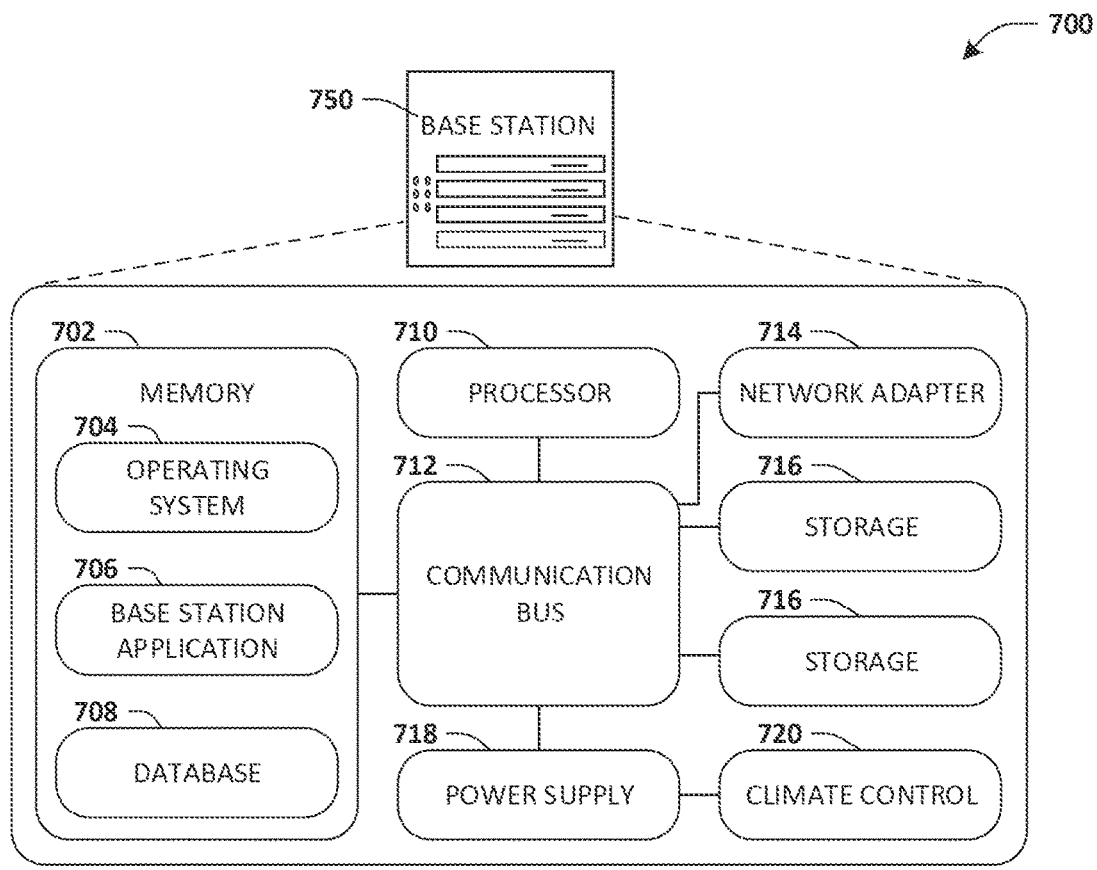
FIG. 7 is an illustration of a scenario involving an example configuration of a base station (BS) that may utilize and/or implement at least a portion of the techniques presented herein.

FIG. 7 presents a schematic architecture diagram 700 of a base station 750 (e.g., a network entity) that may utilize at least a portion of the techniques provided herein. Such a base station 750 may vary widely in configuration and/or capabilities, alone or in conjunction with other base stations, nodes, end units and/or servers, etc. in order to provide a service, such as at least some of one or more of the other disclosed techniques, scenarios, etc. For example, the base station 750 may connect one or more user equipment (UE) to a (e.g., wireless and/or wired) network (e.g., which may be connected and/or include one or more other base stations), such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The network may implement a radio technology, such as Universal Terrestrial Radio Access (UTRA), CDMA2000, Global System for Mobile Communications (GSM), Evolved UTRA (E-UTRA), IEEE 802.11, IEEE 802.16, IEEE 802.20, Flash-OFDM, etc. The base station 750 and/or the network may communicate using a standard, such as Long-Term Evolution (LTE).

The base station 750 may comprise one or more (e.g., hardware) processors 710 that process instructions. The one or more processors 710 may optionally include a plurality of cores; one or more coprocessors, such as a mathematics coprocessor or an integrated graphical processing unit (GPU); and/or one or more layers of local cache memory. The base station 750 may comprise memory 702 storing various forms of applications, such as an operating system 704; one or more base station applications 706; and/or various forms of data, such as a database 708 and/or a file system, etc. The base station 750 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader; and/or other peripheral components.

The base station 750 may comprise a mainboard featuring one or more communication buses 712 that interconnect the processor 710, the memory 702, and/or various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the base station 750 with at least one other server. Other components that may optionally be included with the base station 750 (though not shown in the schematic diagram 700 of FIG. 7) include a display; a display adapter, such as a graphical processing unit (GPU); input peripherals, such as a keyboard and/or mouse; and/or a flash memory device that may store a basic input/output system (BIOS) routine that facilitates booting the base station 750 to a state of readiness, etc.

The base station 750 may operate in various physical enclosures, such as a desktop or tower, and/or may be integrated with a display as an "all-in-one" device. The base station 750 may be mounted horizontally and/or in a cabinet or rack, and/or may simply comprise an interconnected set of components. The base station 750 may comprise a dedicated and/or shared power supply 718 that supplies and/or regulates power for the other components. The base station 750 may provide power to and/or receive power from another base station and/or server and/or other devices. The base station 750 may comprise a shared and/or dedicated climate control unit 720 that regulates climate properties, such as temperature, humidity, and/or airflow. Many such base stations 750 may be configured and/or adapted to utilize at least a portion of the techniques presented herein.

Figure 8:
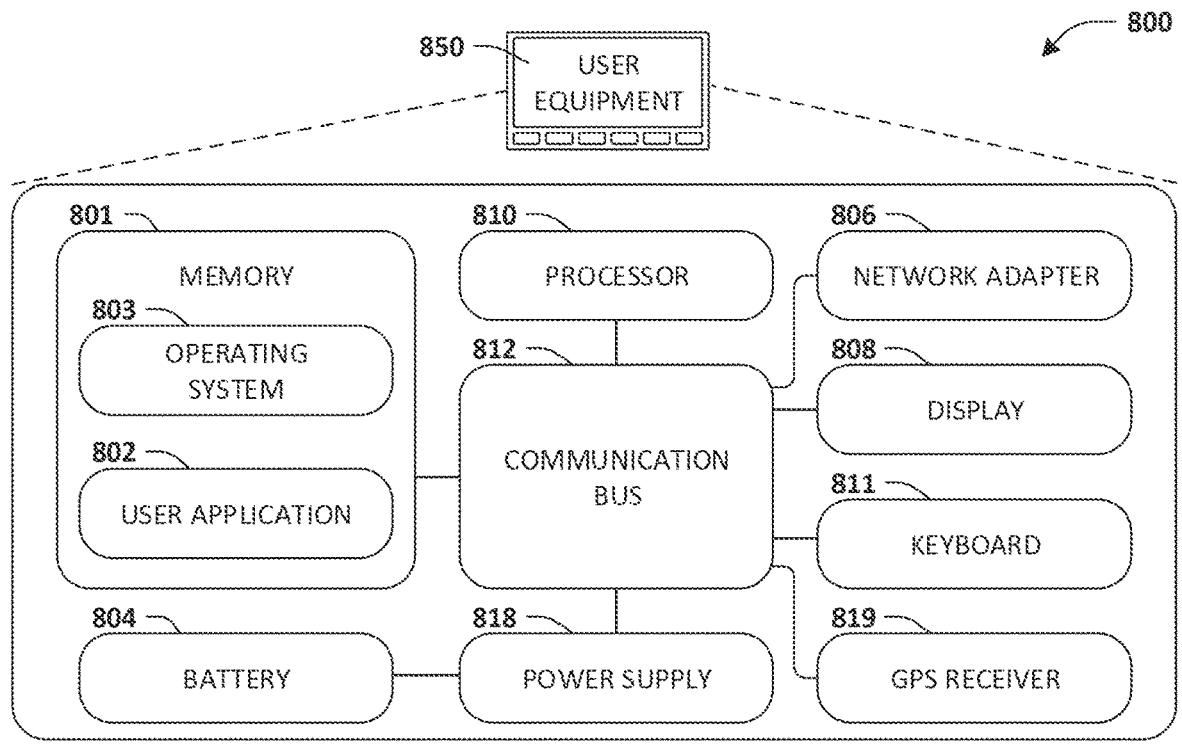
FIG. 8 is an illustration of a scenario involving an example configuration of a user equipment (UE) that may utilize and/or implement at least a portion of the techniques presented herein.

FIG. 8 presents a schematic architecture diagram 800 of a user equipment (UE) 850 (e.g., a communication device) whereupon at least a portion of the techniques presented herein may be implemented. Such a UE 850 may vary widely in configuration and/or capabilities, in order to provide a variety of functionality to a user. The UE 850 may be provided in a variety of form factors, such as a mobile phone (e.g., a smartphone); a desktop or tower workstation; an "all-in-one" device integrated with a display 808; a laptop, tablet, convertible tablet, or palmtop device; a wearable device, such as mountable in a headset, eyeglass, earpiece, and/or wristwatch, and/or integrated with an article of clothing; and/or a component of a piece of furniture, such as a tabletop, and/or of another device, such as a vehicle or residence. The UE 850 may serve the user in a variety of roles, such as a telephone, a workstation, kiosk, media player, gaming device, and/or appliance.

The UE 850 may comprise one or more (e.g., hardware) processors 810 that process instructions. The one or more processors 810 may optionally include a plurality of cores; one or more coprocessors, such as a mathematics coprocessor or an integrated graphical processing unit (GPU); and/or one or more layers of local cache memory. The UE 850 may comprise memory 801 storing various forms of applications, such as an operating system 803; one or more user applications 802, such as document applications, media applications, file and/or data access applications, communication applications, such as web browsers and/or email clients, utilities, and/or games; and/or drivers for various peripherals. The UE 850 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a GPS receiver 819 that detects the location, velocity, and/or acceleration of the UE 850, a compass, accelerometer, and/or gyroscope that detects a physical orientation of the UE 850. Other components that may optionally be included with the UE 850 (though not shown in the schematic architecture diagram 800 of FIG. 8) include one or more storage components, such as a hard disk drive, a solid-state storage device (SSD), a flash memory device, and/or a magnetic and/or optical disk reader; a flash memory device that may store a basic input/output system (BIOS) routine that facilitates booting the UE 850 to a state of readiness; and/or a climate control unit that regulates climate properties, such as temperature, humidity, and airflow, etc.

The UE 850 may comprise a mainboard featuring one or more communication buses 812 that interconnect the processor 810, the memory 801, and/or various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The UE 850 may comprise a dedicated and/or shared power supply 818 that supplies and/or regulates power for other components, and/or a battery 804 that stores power for use while the UE 850 is not connected to a power source via the power supply 818. The UE 850 may provide power to and/or receive power from other client devices.

Figure 9:
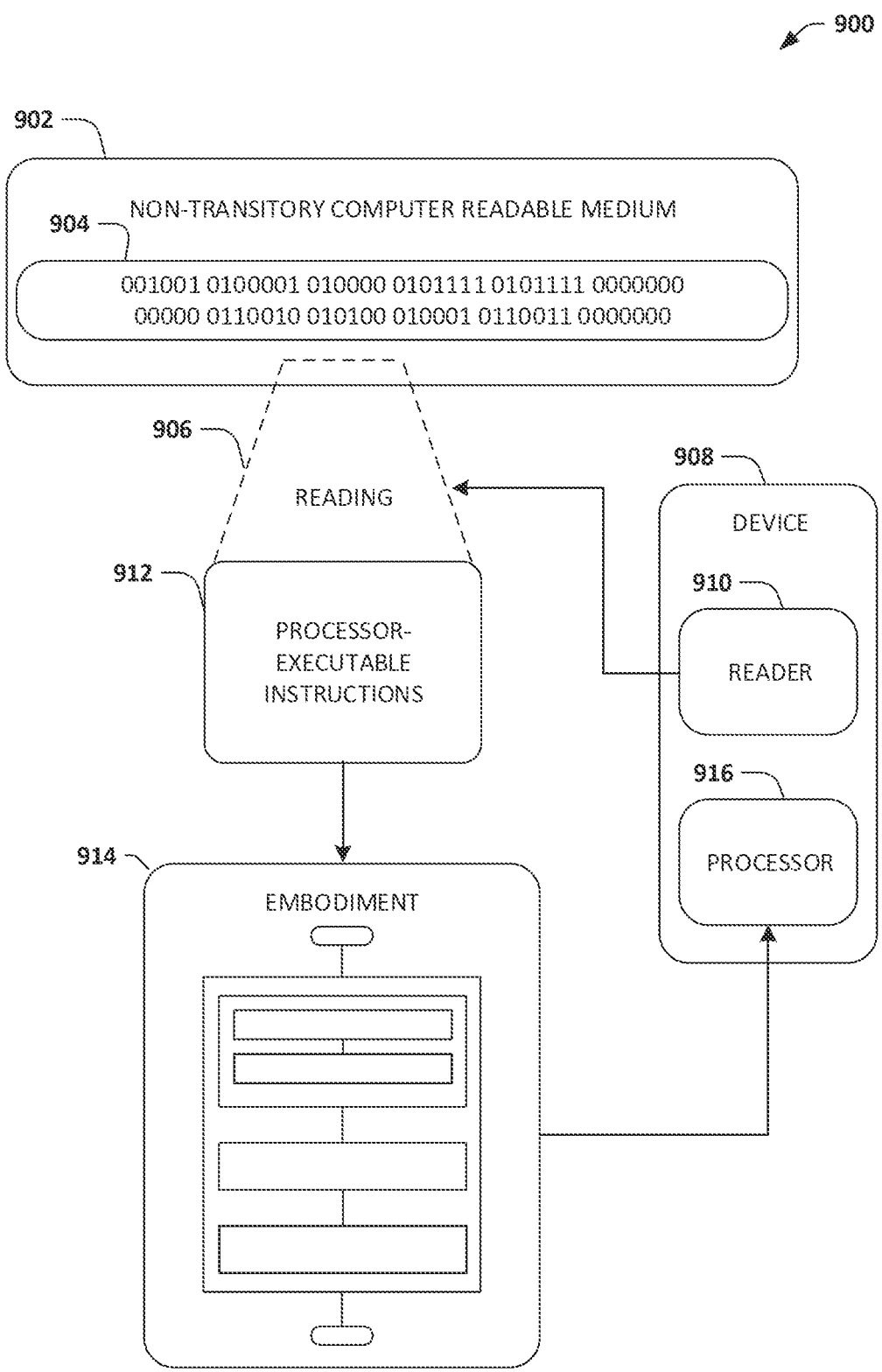
FIG. 9 is an illustration of a scenario featuring an example non-transitory computer readable medium in accordance with one or more of the provisions set forth herein.

FIG. 9 is an illustration of a scenario 900 involving an example non-transitory computer readable medium 902. The non-transitory computer readable medium 902 may comprise processor-executable instructions 912 that when executed by a processor 916 cause performance (e.g., by the processor 916) of at least some of the provisions herein. The non-transitory computer readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drives, a flash memory device, or a magnetic or optical disc (such as a compact disc (CD), digital versatile disc (DVD), and/or floppy disk). The example non-transitory computer readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed, cause performance of operations, such as at least some of the example method 100A of FIG. 1A, the example method 100B of FIG. 1B, and/or the example method 100C of FIG. 1C, for example. In some embodiments, the processor-executable instructions 912 are configured to cause implementation of a system and/or scenario, such as at least some of the example system 200A of FIG. 2A, the example system 200B of FIG. 2B, the example system 300A of FIG. 3A, the example system 300B of FIG. 3B, the example system 400A of FIG. 4A, the example system 400B of FIG. 4B, the example system 500 of FIG. 5, the example system 600A of FIG. 6A, and/or the example system 600B of FIG. 6B, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers (e.g., nodes(s)).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer (e.g., node) to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving, by a communication device from a network entity, a configuration message, the communication device connected to the network entity via a primary path;
identifying, by the communication device from the configuration message, a secondary logical channel identity configured to identify a secondary path connected to the network entity;
configuring, by the communication device, the secondary path based on the configuration message, wherein configuring the secondary path further comprises:
determining whether the secondary path is present, and
releasing, in response to determining that the secondary path is present, the secondary path based on the configuration message by removing a second radio link control entity corresponding to the secondary path within the network entity; and
transmitting, by the communication device to the network entity, in response to the configuration, a response message.

2. The method of claim 1, wherein
the second radio link control entity was connected to a packet data convergence protocol entity.

3. The method of claim 1, wherein configuring the secondary path further comprises:
determining, by the communication device, whether the secondary path is present; and
establishing, by the communication device, in response to determining that the secondary path is not present, the secondary path based on the configuration message.

4. The method of claim 3, further comprising:
generating, by the communication device, a mapping between the secondary path and a radio bearer.

5. The method of claim 4, further comprising:
identifying, by the communication device from the configuration message, a radio bearer identity to identify the radio bearer.

6. The method of claim 1, wherein configuring the secondary path further comprises:
determining, by the communication device, whether the secondary path is present; and
modifying, by the communication device, in response to determining that the secondary path is present, the secondary path based on the configuration message.

7. A communication device, comprising:
one or more processors configured to:
receive, from a network entity, a configuration message, the communication device connected to the network entity via a primary path;
identify, from the configuration message, a secondary logical channel identity configured to identify a secondary path connected to the network entity;
configure the secondary path based on the configuration message, wherein configuring the secondary path further comprises:
determining whether the secondary path is present, and
releasing, in response to determining that the secondary path is present, the secondary path based on the configuration message by removing a second radio link control entity corresponding to the secondary path within the network entity; and
transmit, to the network entity, in response to the configuration, a response message.

8. The communication device of claim 7, wherein the second radio link control entity was connected to a packet data convergence protocol entity.

9. The communication device of claim 7, wherein configuring the secondary path further comprises:
determining whether the secondary path is present; and
establishing, in response to determining that the secondary path is not present, the secondary path based on the configuration message.

10. The communication device of claim 9, wherein the one or more processors are further configured to generate a mapping between the secondary path and a radio bearer.

11. The communication device of claim 10, wherein the one or more processors are configured to identify, from the configuration message, a radio bearer identity to identify the radio bearer.

12. The communication device of claim 7, wherein configuring the secondary path further comprises:
determining whether the secondary path is present; and
modifying, in response to determining that the secondary path is present, the secondary path based on the configuration message.

13. A non-transitory computer readable medium storing instructions, which when executed by at least one processor, cause the at least one processor to:
receive, from a network entity, a configuration message, the communication device connected to the network entity via a primary path;
identify, from the configuration message, a secondary logical channel identity configured to identify a secondary path connected to the network entity;
configure the secondary path based on the configuration message, wherein configuring the secondary path further comprises:
determining whether the secondary path is present, and
releasing, in response to determining that the secondary path is present, the secondary path based on the configuration message by removing a second radio link control entity corresponding to the secondary path within the network entity; and
transmit, to the network entity, in response to the configuration, a response message.

14. The non-transitory computer readable medium of claim 13, wherein the second radio link control entity was connected to a packet data convergence protocol entity.

15. The non-transitory computer readable medium of claim 13, wherein the instructions when executed by the at least one processor, further cause the at least one processor to:
determine whether the secondary path is present; and
establish, in response to determining that the secondary path is not present, the secondary path based on the configuration message.

16. The non-transitory computer readable medium of claim 15, wherein the instructions when executed by the at least one processor, further cause the at least one processor to generate a mapping between the secondary path and a radio bearer.

17. The non-transitory computer readable medium of claim 16, wherein the instructions when executed by the at least one processor, further cause the at least one processor to identify, from the configuration message, a radio bearer identity to identify the radio bearer.

18. The non-transitory computer readable medium of claim 13, wherein the instructions when executed by the at least one processor, further cause the at least one processor to:
 determine whether the secondary path is present; and
 modify, in response to determining that the secondary path is present, the secondary path based on the configuration message.

\* \* \* \* \*